United States Patent [19]

McLean et al.

[11] 3,911,402

[45] Oct. 7, 1975

[54] DIAGNOSTIC CIRCUIT FOR DATA PROCESSING SYSTEM

[75] Inventors: Peter McLean, Stow; Stephen R. Jenkins, Medford; Victor Ku, Westboro, all of Mass.

[73] Assignee: Digital Equipment Corporation, Maynard, Mass.

[22] Filed: June 3, 1974

[21] Appl. No.: 475,838

[52] U.S. Cl. .......................... 340/172.5; 235/153 AK

[51] Int. Cl.[2] .......................................... G06F 11/04

[58] Field of Search ............ 340/172.5; 235/153 AK

[56] References Cited

UNITED STATES PATENTS

| | | | |
|---|---|---|---|
| 3,376,554 | 4/1968 | Kotok et al. | 340/172.5 |
| 3,810,120 | 5/1974 | Huettner et al. | 340/172.5 |
| 3,813,647 | 5/1974 | Loo | 340/172.5 |
| 3,814,919 | 6/1974 | Repton et al. | 235/153 AK |
| 3,814,922 | 6/1974 | Nibby | 235/153 AK |
| 3,938,260 | 9/1974 | Nelson | 235/153 AK |

*Primary Examiner*—Charles E. Atkinson
*Attorney, Agent, or Firm*—Cesari and McKenna

[57] ABSTRACT

A diagnostic circuit for analyzing the operation of a data processing system including units in a secondary storage facility, such as magnetic tape, disk or drum drive units, or other sequential access storage units. Each unit contains a multiple-stage register and circuits for conditioning certain stages under the control of a central processing unit in the data processing system. A first register stage is set to place the unit in a diagnostic, rather than a normal, operating mode. In the diagnostic mode, analog portions of the drive, such as analog circuits associated with reading and writing data on the surface of a recording medium, i.e., the tape, disk or drum, are isolated from the rest of the circuits. As the central processing unit processes other instructions in a diagnostic program in sequence, a second stage in the register produces a timing signal to be substituted for a corresponding signal obtained from the analog portion during normal operation. Further, data itself can be transferred into or from the drive, but the recording medium is not affected because it is isolated. The central processing unit can also monitor these and other stages in the register to ascertain the state of certain signals at critical analysis points.

18 Claims, 17 Drawing Figures

DIAGNOSTIC CIRCUIT FOR DATA PROCESSING SYSTEM

BACKGROUND OF THE INVENTION

This invention generally relates to data processing systems and more specifically to diagnostic circuits for such systems, especially secondary storage facilities in such systems.

Secondary storage facilities are examples of elements which are not an integral part of a central processing unit and its random access memory element, but which are directly connected to and controlled by the central processing unit or other elements in the system. These facilities are also known as "mass storage" elements and include magnetic tape memory units, disk units and drum units.

These facilities are also termed "sequential access storage units" because the information stored in one of these units becomes available, or is stored, only in a "one-after-the-other" sequence, whether or not all the information or only some of it is desired. For example, it is usual practice to retrieve information from a disk unit on a "sector-by-sector" basis, even though only one of several information records in a sector is needed. Similarly, a physical record on a tape is analogous to a sector on a disk and a complete physical record may be retrieved even though it may contain more than one relevant information record.

These devices also are known as "serial storage devices". In a serial storage device, time and sequential position are factors used to locate any given bit, character, word or groups of words appearing one after the other in time sequence. The individual bits appear or are read serially in time.

In modern data processing systems a secondary storage facility includes a controller and one or more drives connected thereto. The controller operates in response to signals from the data processing system, usually on an input/output bus which connects other elements in the system, including the central processing unit, together. A drive contains the recording medium (e.g., tape or a rotating disk), the mechanism for moving the medium, and electronic circuitry to read data from or store data on the medium and also to convert the data between serial and parallel formats.

The controller appears to the rest of the system as any other system element on the input/outut bus. It receives commands over the bus which include command information about the operation to be performed, the drive to be used, the size of the transfer, the starting address on the drive for the transfer, and the starting address in some other system element, such as a random access memory unit. The controller converts all this command information into the necessary signals to each transfer betwen appropriate drive and other system elements. During the transfer itself, the controller routes the data to or from the appropriate drive and from or to the input/output bus or a memory bus.

If a secondary storage facility or other system element malfunctions, it is necessary promptly to analyze or diagnose and correct the failure or malfunction. Normally an entire data processing system is inoperative when an element, such as a secondary storage facility, fails or malfunctions.

In prior data processing systems, diagnostic programs are processed to determine sources of such failures or malfunctions. However, these programs are quite limited in scope. For example, only the operation of the controller can be monitored in a secondary storage facility. If the controller is operating properly, the individual drives and cables interconnecting the drives and controller must be analyzed. Generally a program is run or special test equipment is used to simulate repetitive transfers of a known data pattern. Oscilloscopes or other test equipment monitor critical points to analyze the operation. However, the circuits and mechanical mechanisms are quite complex, so these diagnostic operations are often difficult, tedious and frustrating to the person analyzing the malfunction or failure. There is no way to rapidly monitor several signals simultaneously, and each testing operation requires a relocation of test equipment leads.

Recent systems do enable an extension of diagnosis under a diagnostic program. For example, transfers to or from control registers in a diagnostic operation could test at least some drive circuits. However, circuit response during data transfers could not be tested. Thus, even in these systems, the diagnosis under program control is limited and does not provide all the needed information.

Therefore, it is an object of this invention to provide circuits in an element of a data processing system which enable a diagnostic program to test most or all the digital circuitry in that element.

Another object of this invention is to provide circuitry which enables a diagnostic program to test most or all the digital circuits in a controller, a drive and interconnecting cables which comprise a secondary storage facility.

Still another object of this invention is to provide diagnostic circuits in an element of a data processing system which enables the diagnostic operations to be performed substantially under normal operating conditions.

SUMMARY OF THE INVENTION

In accordance with this invention, an element in a data processing system contains a maintenance register. Whenever a first register stage assumes a first state or condition, the element operates in a diagnostic mode. In the diagnostic mode most or all the digital circuits remain connected to the system, but they are isolated from other circuits in the element, such as analog circuits for altering data in a storage medium. A second register stage is shifted between its two states to produce a clocking signal which is substituted for a timing signal normally derived from the other, now isolated, circuits in the element. All the remaining circuits operate under the control of the substituted timing signal.

The foregoing and other register stages are monitored to determine actual and expected signals. A diagnostic program processed by the central processor unit controls the transfer of information to and from the register and normally pinpoints the cause of any malfunction or failure to a few potential areas. This greatly reduces the time necessary for correcting failures and malfunctions.

This invention is pointed out with particularity in the appended claims. The above and further objects and advantages of this invention may be attained by referring to the following description taken in conjunction with the accompanying drawings.

BRIEF DESCRIPTION OF THE DRAWINGS

FIG. 14 which comprises

DESCRIPTION OF ILLUSTRATIVE EMBODIMENTS

I. General Description

Figure 1:
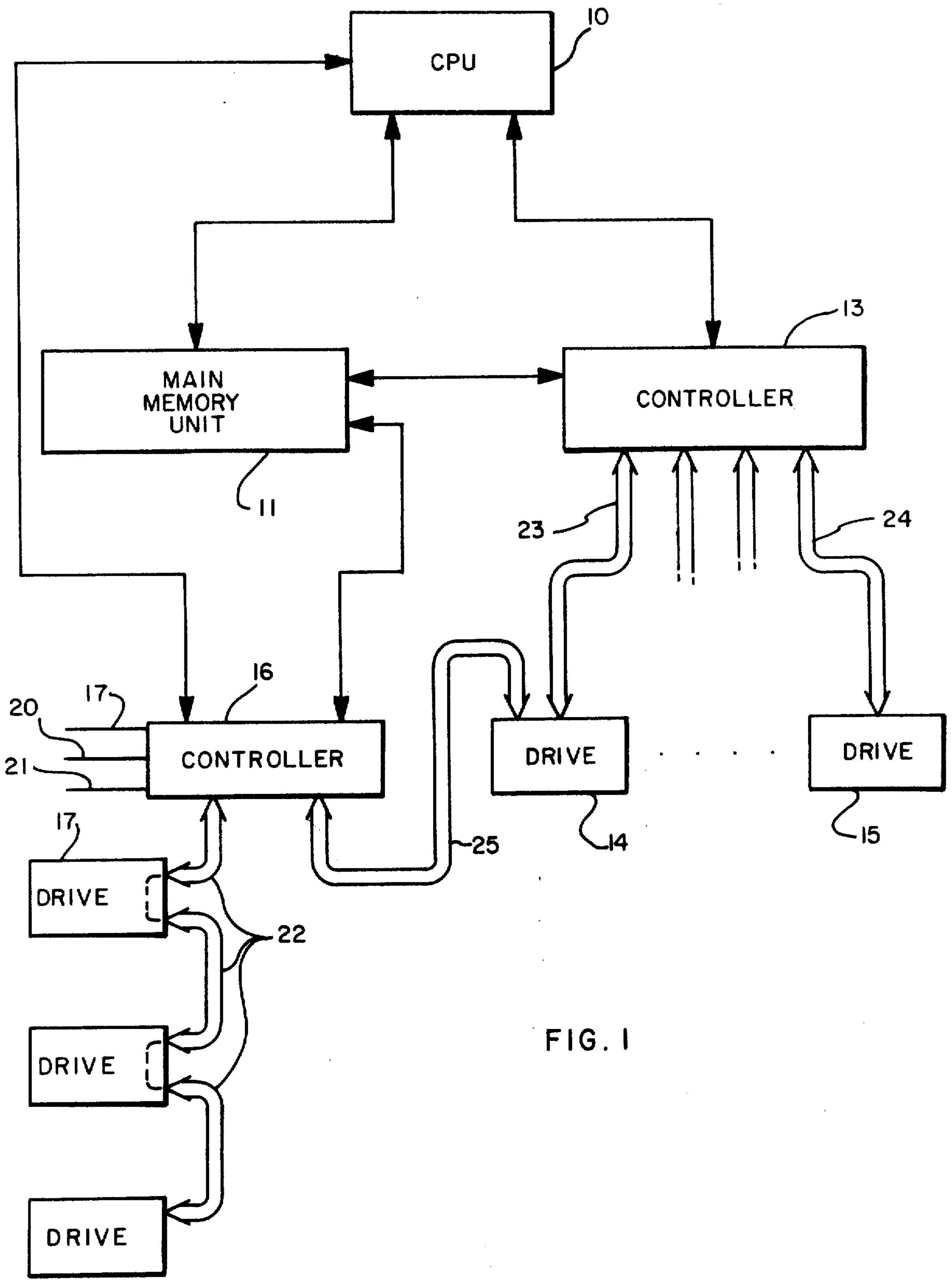
FIG. 1 is a generalized block diagram of a data processing system adapted to use this invention.

FIG. 1 depicts the general organization of a data processing system comprising a central processing unit (CPU) 10 and a main memory unit 11, normally a random access memory unit. Information also may be transferred to or from a secondary storage facility including a controller 13 and several drives, drives 14 and 15 being shown by way of example. Another such storage facility includes a controller 16 and drives 17, 20 and 21. This facility is also coupled to the central processing unit 10 and the main memory unit 11.

As previously indicated, a "drive" includes a recording medium and the mechanical and electrical components for recording data on or reading from the recording medium in the context of this invention. For example, it can comprise a fixed or movable head disk memory unit, a magnetic drum memory unit or a magnetic tape unit, as well as non-mechanically driven memory units. Timing signals derived from the medium normally synchronize data transfers with movement of the medium. A typical drive contains control, status, error and other registers for controlling and monitoring drive operations.

A controller 13 or 16 may be located physically separately from the central processing unit 10 as shown in FIG. 1 or may be an integral part of a central processing unit. Controllers serve as "interfaces" between the central processing unit and the drive. They contain the circuits for exchanging data with either the central processing unit 10 or the main memory unit 11. Buffer registers in the controller 13 or 16 compensate for the usually different transfer rates between the controller and main memory unit 11, on the one hand, and between the controller and drive, on the other hand.

Drives are connected to controllers by means of device buses in several different configurations. If, for example, the controller 16 were connected to drive 17 only, the arrangement would be termed a "single drive" configuration. Actually, as shown in FIG. 1, the drives 17, 20 and 21 are interconnected by a device bus 22 which is threaded from one drive to the next. This is an example of a "daisy-chain" configuration. Device buses 23 and 24 connect drives 14 and 15, respectively, in a "radial" configuration. Drive 14 is linked to the controller 16 by way of a device bus 25; the drive 14 is thus in a "dual controller-single drive" configuration.

The user of a system will determine his own specific configuration. It also will become apparent that if drive 14 is one type of magnetic disk memory unit, drive 15 can be another unit of the same type, a magnetic disk memory unit of another type, or even a magnetic tape or magnetic drum unit or other type of sequential access memory. Moreover, drives 17, 20 and 21 could be directly connected to controller 13 without any modification to either the controller 13 or any of the drives.

Each of the device buses 22, 23, 24 and 25 contains a standard set of corresponding conductors for transferring signals, notwithstanding the drive connected to the device bus or the data processing system which is involved.

Figure 2:
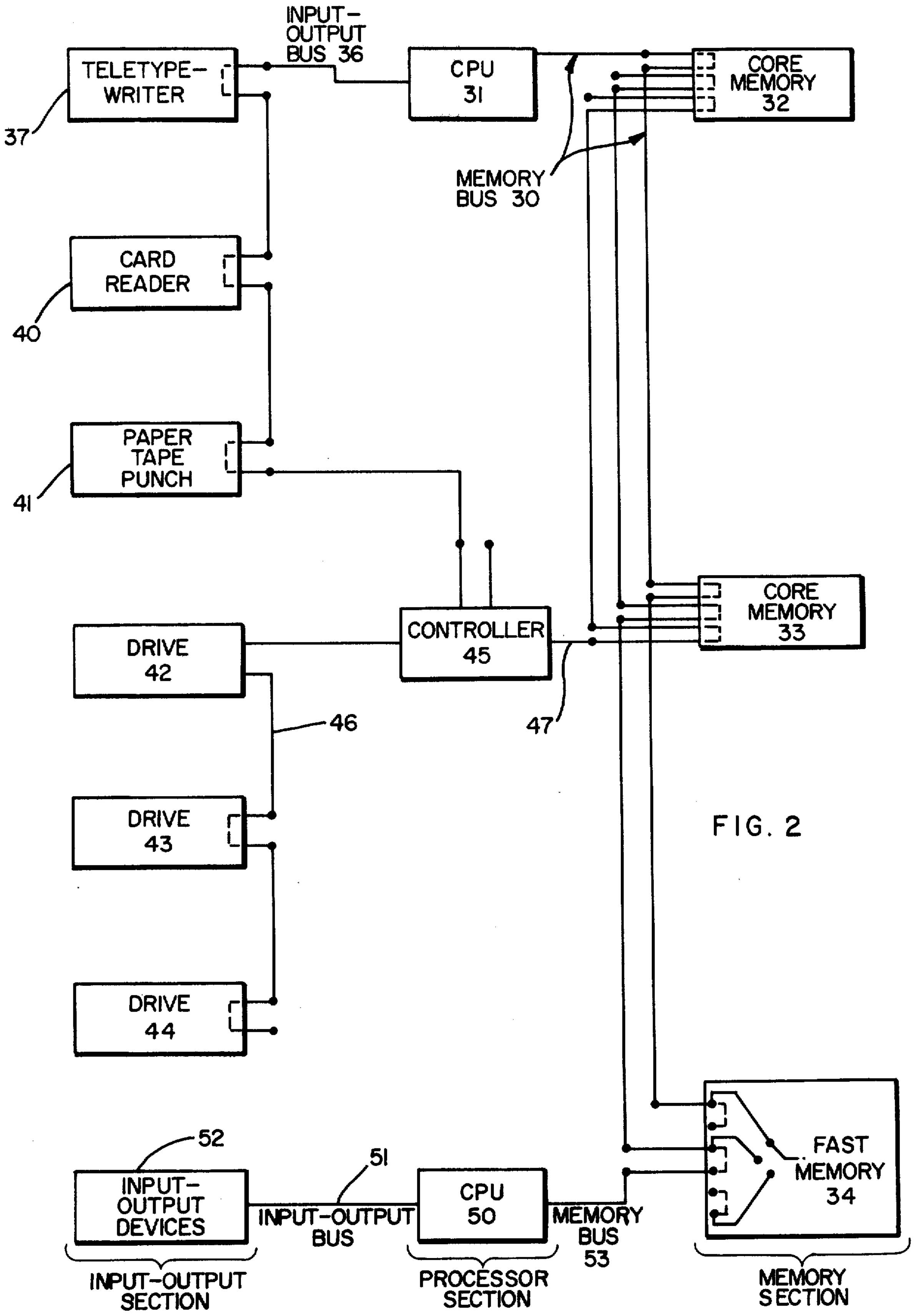
FIG. 2 is a block diagram of one type of data processing system shown in FIG. 1 in which separate memory and input/output buses link elements in the system.
Figure 3:
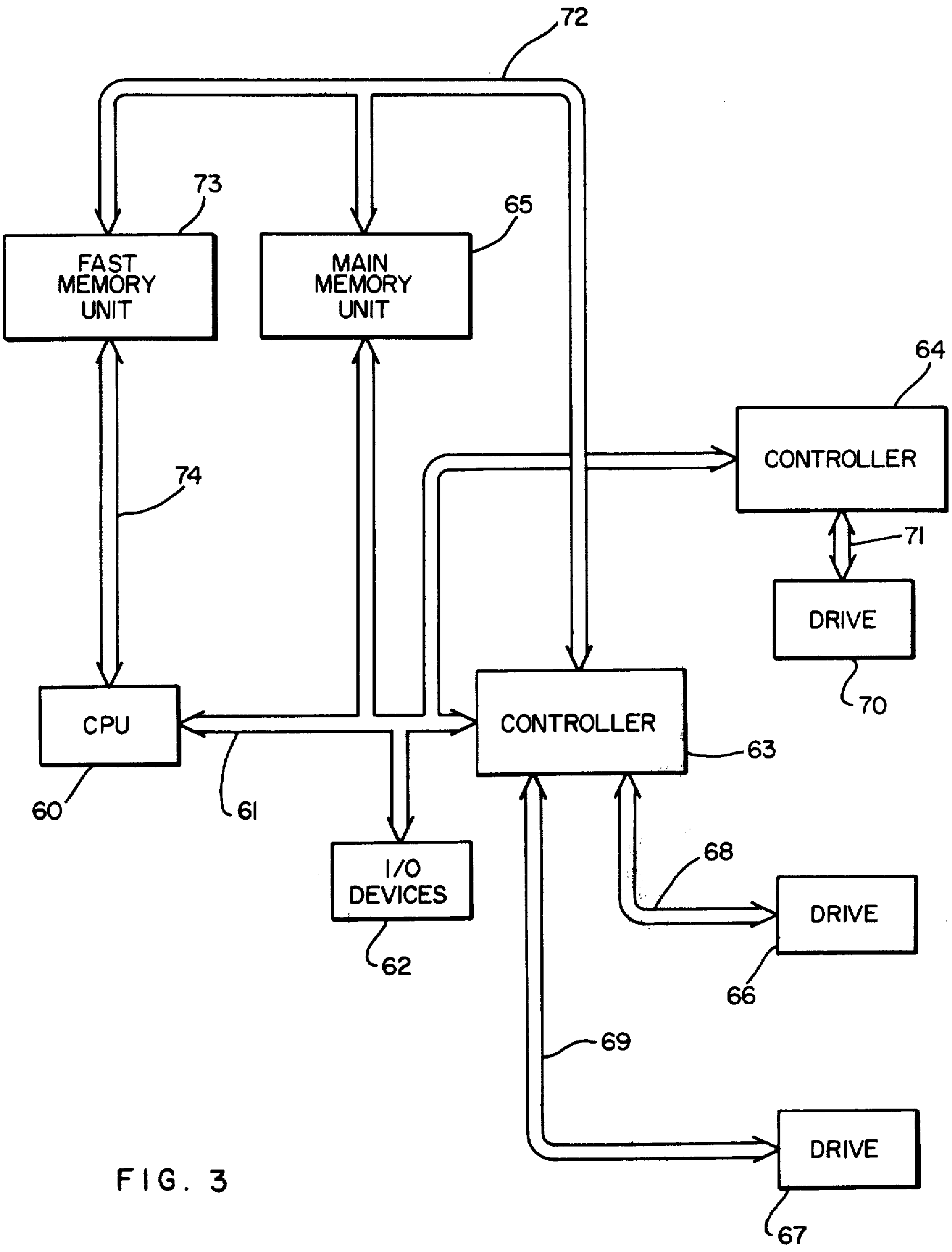
FIG. 3 is a block diagram of another type of data processing system shown in FIG. 1 in which a single bus is common to all elements in the system.

FIGS. 2 and 3 depict diverse types of data processing systems. The nature of the data processing system has no effect on the drive itself. Although these two data processing systems form no part of the invention, specific examples of data processing systems will facilitate an understanding of the detailed discussion of this invention.

FIG. 2 illustrates a data processing system containing two separate data paths. The system is also segregated into input-output, processor and memory sections. A memory bus 30 connects a first central processing unit (CPU) 31 with a memory section including, for example, a core memory 32, a core memory 33 and a fast or volatile memory 34. An input-output bus 36 connects the central processing unit 31 with several input-output devices such as a teletypewriter 37, a card reader 40, and a paper tape punch 41. The memory bus 30 and the input-output bus 36 carry control, address and data in two directions. The signals on each bus are transferred in parallel, as distinguished from serial, transmission.

The central processing unit 31 can also control the transfer of data between the memory section and a secondary storage facility. In FIG. 2 this storage facility comprises drives 42, 43 and 44 connected to a controller 45 by a device bus 46 in a daisy-chain configuration. In accordance with this invention, the controller 45 receives control information over the input-output bus 36 to be processed by asynchronous drive control path within the controller 45. A synchronous data path in the controller may transfer data to the memory bus 30 or, as shown, to a second memory bus 47. Thus, transfers between the secondary storage facility and the memory section occur only with minimum use of the input-output bus 36 and the central processing unit 31 because data can be transferred directly through the controller 45 to the memory section. As also shown in FIG. 2 a second central processing unit 50 connects through an input-output bus 51 to other input-output devices 52. The central processing unit 50 also connects to the memory section through a bus 53, which enables the unit 50 to use the memory units 32, 33 and 34 in common with the processing unit 31 including data supplied to the memory section by the secondary facility.

As previously stated, this is an example of a data processing system which has separate input-output and memory buses. In operation, the central processing unit 31 might require some program stored in the drive 42. A second program already contained in the memory section would contain the necessary instructions to transfer a command to the controller 45 over the bus 36 to identify a particular drive, such as the drive 42, the starting location in the drive (e.g., the track and sector numbers in a disk memory unit) and other necessary information, as known in the art. Once the controller 45 receives that information, it retrieves data from the drive 42 and then transfers it to the memory bus 47 directly for storage and subsequent use by the central processing unit 31 or even the central processing unit 50. Analogous transfers occur in a system using a common bus to interconnect the system elements. Such a system is shown in FIG. 3 and comprises a central processing unit (CPU) 60 and a first common bus 61. The bus contains address, data and control conductors. It connects the central processing unit 60 in parallel with input-output devices 62 and controllers 63 and 64 associated with two secondary storage facilities.

The system in FIG. 3 includes a main memory unit 65 connected to the bus 61. Data transfers can occur over the bus 61 between the main memory unit 65 and any of the drives 66 and 67 connected to the controller 63 in a radial configuration by device buses 68 and 69, respectively, or a drive 70 connected in a single drive configuration to controller 64 by a device bus 71. Once stored, these transfers occur over the bus 61 without requiring the processor to perform an interruption routine.

The controller 63 has an additional connection for another bus 72 which is identical to the bus 61. The bus 72 is coupled to a second part of the main memory 65, which is a "dual-port" memory. This bus 72 also connects to a fast memory 73, which is coupled to the central processing unit 60 through dedicated bus 74.

With this data processing system, the central processing unit 60 can transfer a command to the controller 63 over the bus 61. The controller 63 then prepares a drive, such as the drive 66 for an operation by transferring control information over the drive control path in the device bus 68. Data can then pass over the synchronous data path in the device bus 68 through the controller 63 and then either onto the bus 61 or, for more efficient operation, over the bus 72 directly into the memory 65 or 73. If the transfer is being made to another one of the input-output devices 62, the data may pass over the bus 61.

The signals over each of the device buses 46 in FIG. 2 and 68, 69 and 71 in FIG. 3 are the same. This means that the controllers 45, 63 and 64 have the same circuitry at their respective device bus connections. The only required differences between the controllers are those necessary for connection to the data processing system buses.

II. The Device Bus

Figure 4:
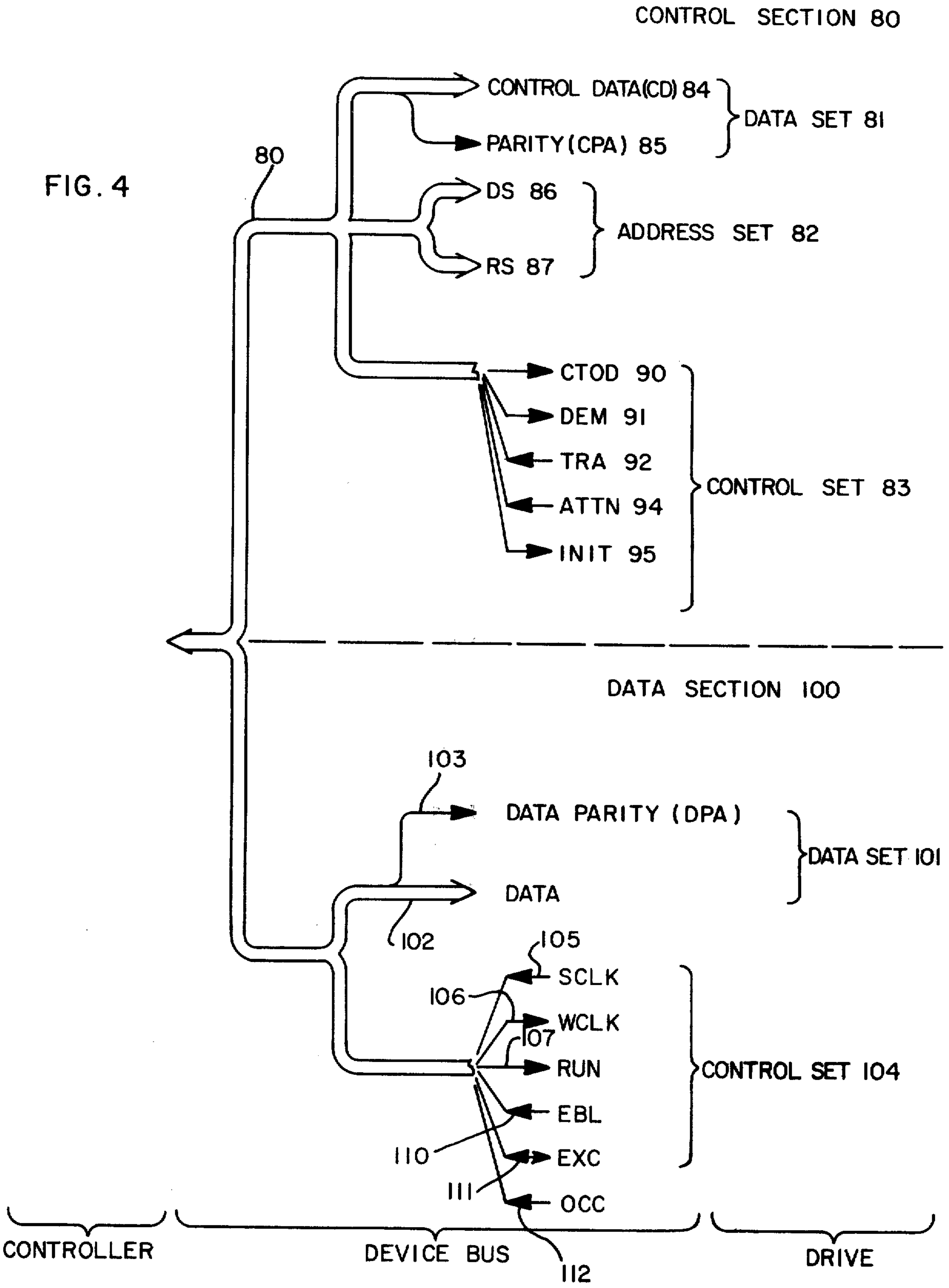
FIG. 4 depicts an interconnecting bus between a drive and controller in accordance with this invention.

To understand the interaction between a controller and device it is helpful to discuss first the specific signals which appear on the deivce bus and the functions each performs. A device bus, with the signal designations, is shown in FIG. 4; and the same mnemonic identifies a wire or group of wires and the signals they carry. Each device bus has the same construction. A drive control section 80 contains conductors segregated into a data set 81, an address set 82 and a control set 83. Within the data set 81 there are bidirectional control data (CD) wires 84 and a bidirectional control data parity (CPA) wire 85 for carrying control and status information between a controller and any of its respective drives. The CPA wire 85 carries a parity bit. The control information includes commands which control the operation of the drive. Some of the commands initiate data transfer and include READ, WRITE and WRITE CHECK commands. Other commands initiate control operations such as positioning heads in a moveable head disk drive or winding a tape in a magnetic tape drive.

Within the address set 82, there are drive selection (DS) wires 86 and register selection (RS) wires 87. The DS wires 86 carry DS signals from a controller to provide information for selecting a drive for an ensuing transfer of controller staus information. A controller also transmits the RS signals. Within the drive identified by the DS signals the RS signals define a specific register which is to be involved in a transfer.

The control set 83 includes a controller-to-drive transfer (CTOD) wire 90. When a controller asserts a CTOD signal (i.e., a logic ONE signal level), the following transfer over the data set 81 is from the controller to the selected register in the selected drive. When the CTOD signal is not asserted, (i.e., is at a logic ZERO signal level), the transfer is from the drive selected register to the controller.

A demand (DEM) wire 91 and a transfer (TRA) wire 92 carry asychronous timing signals. Specifically, the controller puts a DEM signal onto the wire 91 to initiate a transfer of control information. The selected drive transmits the TRA signal to indicate the receipt of control information or the availability of status information.

Whenever any drive requires some interaction with the controller and data processing system, it transmits an ATTN signal onto a single ATTN wire 94 which is common to all drives. Usually the controller responds by interrupting the data processing system.

An INIT signal on a wire 95 serves as a system resetting signal. Upon receipt of the INIT signal, a drive immediately terminates its operation, clears all error conditions and becomes available to the controller and system for further operations.

A synchronous data section 100 shown in FIG. 4 carries blocks of data at high transmission speeds between the controller and drives. These blocks of data are carried in response to READ, WRITE and WRITE-CHECK commands previously sent to a controller and its respective drive with related transfers occuring over the control section 80. The data section 100 also serves as a link for control signals which initiate and terminate the block transmissions. Bidirectionally conducting wires in a data set 101 comprise data wires 102 for carrying the data itself and a data parity (DPA) wire 103. A control set 104 includes a SCLK wire 105 and a WCLK wire 106. The drive uses timing signals derived from the recording medium to produce SCLK signals on the SCLK wire 105 to synchronize the reading of data from the data wires 102 and DPA wire 103 when the data moves to the controller. When the data is to be stored in the drive, the controller receives SCLK signals and transmits WCLK signals back to the drive. The WCLK signals control the writing of data onto the recording medium in the device.

A RUN signal controls the initiation of a data transfer and the overall duration of the transfer; it appears on a RUN wire 107. The controller asserts the RUN signal to start a data transfer in accordance with a command which was previously transferred to the drive over the drive control section 80. Subsequently, circuits in the drive use the RUN signal to determine the time for terminating the transfer. An EBL signal transmitted by the drive on a wire 110 signals the end of a "block". Any transfer terminates if, at the end of an EBL signal, the RUN signal is not asserted. Otherwise, the transfer operation continues through the next "block". In this connection the term "block" has a conventional meaning as applied to magnetic tape memory units and is equivalent to a "sector" as that term is conventionally applied to magnetic disk memory units. Thus, as used in this description, "block" is used in a generic sense to indicate a conveniently sized group of data bits to be sent as a unit.

A wire 111 in the synchronous data section 100 is a bidirectional wire for carrying exception (EXC) signals. When the drive transmits the EXC signal, some error has occurred during the transmission. This signal remains asserted until the last EBL signal during the transfer terminates. An EXC signal from a controller, on the other hand, causes the drive to terminate any action it was performing response to a command.

There is also an occupied (OCC) wire 112. Whenever a drive beings to perform a data transfer over the synchronous section 100, the drive transmits an OCC signal to a controller. This positively indicates that a drive connected to that controller is busy with a data transfer.

With this understanding of the signals which appear on a device bus, it is possible to discuss generally the circuits in a controller. Looking first at the synchronous data path in FIG. 5, it will be apparent that only one drive connected to a controller may respond to a READ, WRITE or WRITE-CHECK command at any given time because the data section 100 is connected to all the drives a controller supervises. Data transfers pass between a system bus 120 and a device bus 121. The system bus might be the memory bus 30 in FIG. 2 or either of the buses 61 or 72 in FIG. 3. Reference numerals used to designate wires in FIG. 4 are applied to corresponding wires in FIGS. 5 through 7 as all device buses are the same.

Incoming data from either a system bus 120 in response to a WRITE command or the data section 101 of a device bus 121 in response to a READ or WRITE-CHECK command is loaded into an input buffer 122 for transfer into a storage facility 123. When the facility 123 moves a word to its output, the word is loaded into an output buffer 124. A data path control circuit, generally 126, then either effects a transfer onto the device bus 121 for transfer to the device or a transfer onto the system bus 120 for transfer to a designated location in the data processing system. The controller also contains the necessary circuits for generating the appropriate address signals to identify a memory location which either stores the data to be transferred to the controller or which is to receive the data from the drive.

III. Drive Control Path

Figure 6:
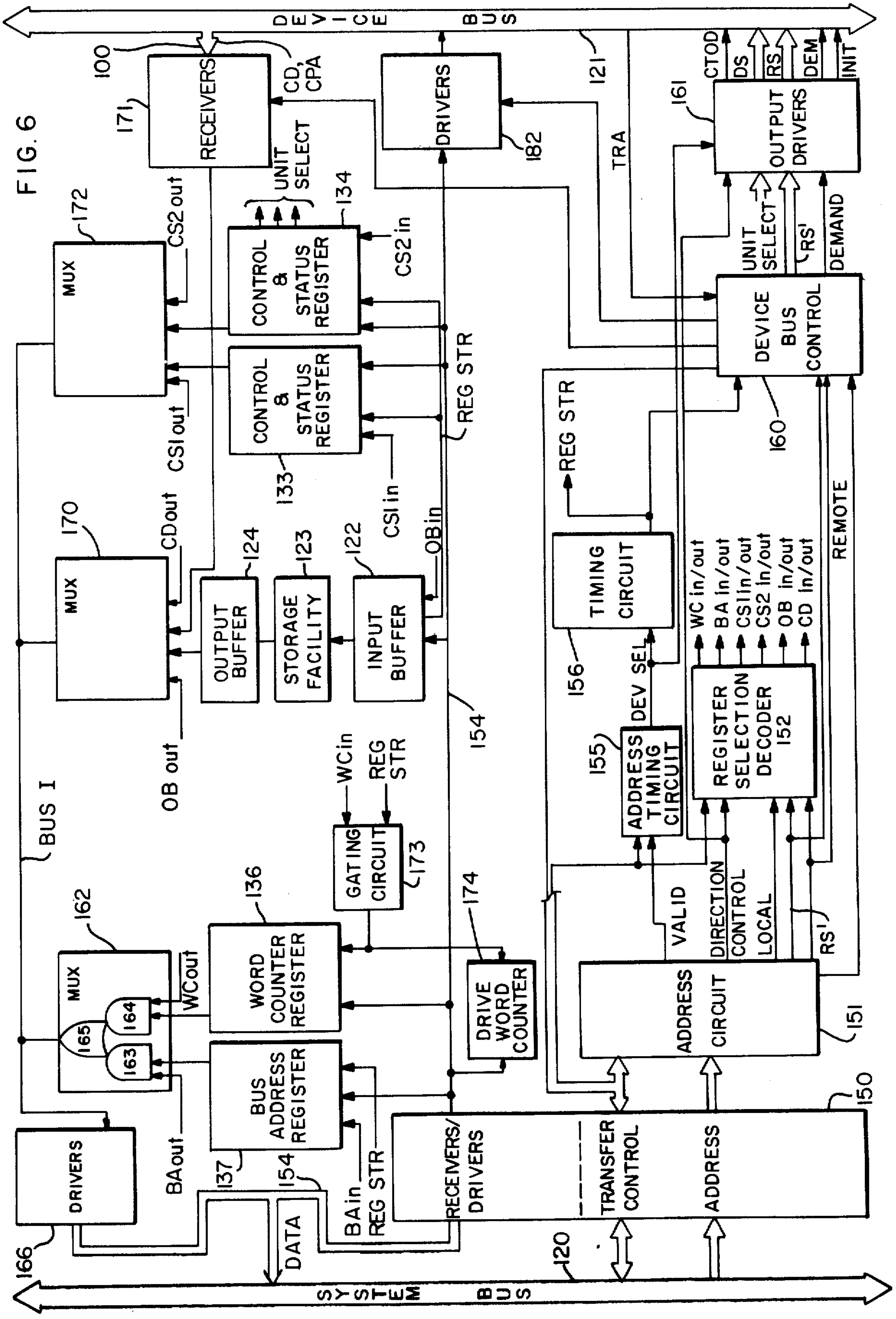
FIG. 6 is a block diagram of an asynchronous drive control path in a controller as adapted for connection to a system as shown in FIGS. 2 or 3.
Figure 7:
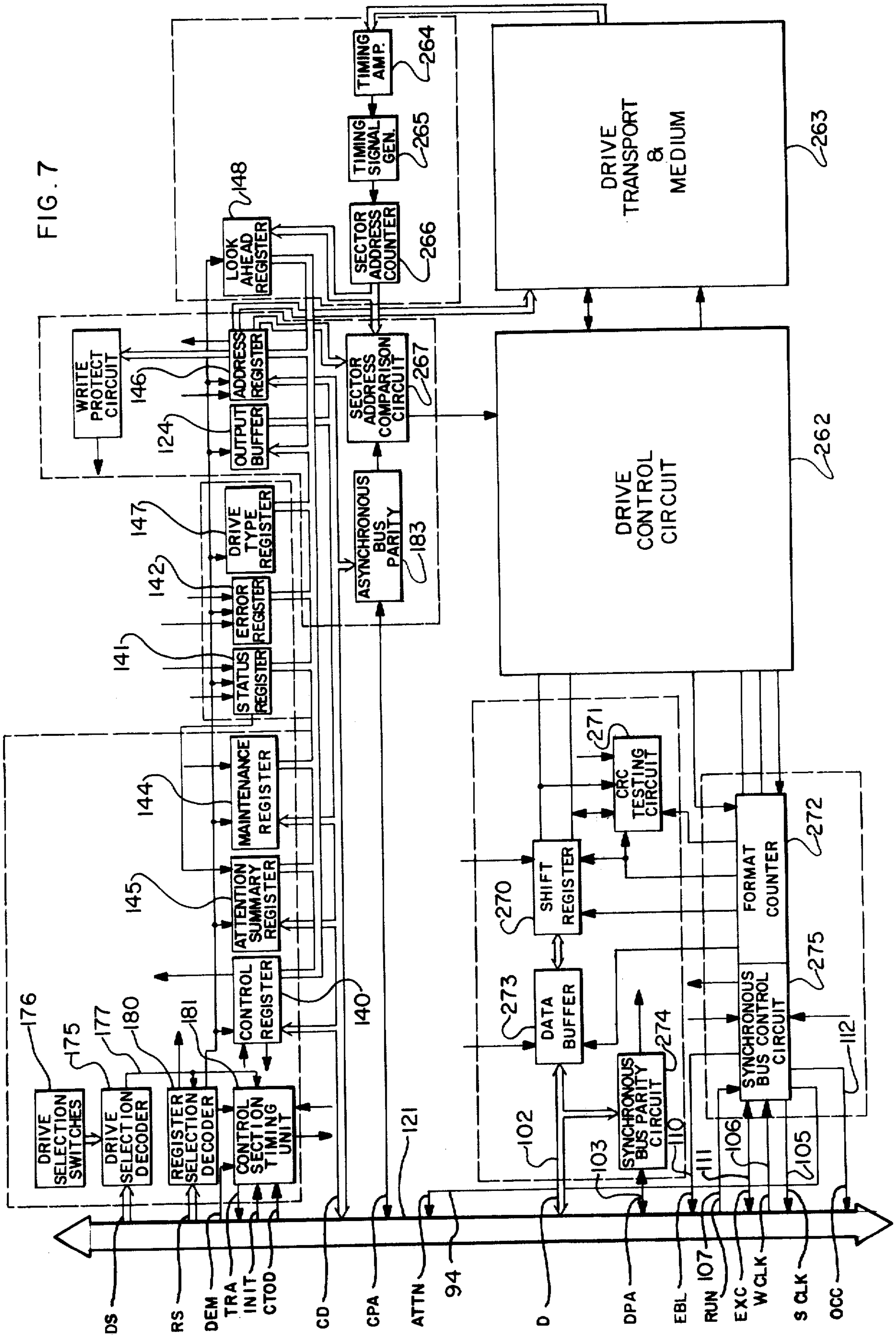
FIG. 7 is a block diagram of a drive constructed in accordance with this invention.

A typical drive control path is shown in FIGS. 6 and 7. The controller shown in FIG. 6 contains several registers, which are called "local" registers. They include:

1. Control and status register 133 and 134 for receiving commands and for receiving and storing operational status information for the controller;
2. The output buffer 124; this register has a connection 124 (FIG. 5) to the drive control path and its contents may be retrieved under system control for diagnostic and other purposes;
3. A word counter register 136 for storing the number of words to be transferred; it counts each data word as it is transferred and disables the drive upon the completion of the transfer;
4. A bus address register 137 for storing the address of a location connected to the system bus 120, which is either sending or receiving the data.

FIG. 7 depicts a fixed-head disk memory unit as a typical drive for purposes of explanation. Such a drive contains the following registers, which are called "remote" registers:

1. A control register 140 analogous to the control and status register 133 (FIG. 6); it stores commands and other control information; the control register 140 and the control and status register 133 can be considered as a single register in which stages are distributed among the controller and each drive connected to the controller;
2. A status register 141 for storing non-error status bits and a summary error bit; one bit position, for example, indicates whether the drive is in a ready state;
3. An error register 142 for storing error information; other drives may contain more than one such register;
4. A maintenance register 144 for storing information useful in diagnostic and maintenance operations as described in more detail later;
5. A stage in attention summary register 145; each drive has one stage for indicating whether it has generated an ATTN signal; this register can be considered as having individual stages distributed among each of the drives.
6. A desired track and sector address register 146 for storing the number of the drive track and sector at which a transfer is to start;
7. A drive type register 147 for storing information concerning the nature of the drive; and
8. A look-ahead register 148 for storing information concerning the actual rotational position of the disk.

Other registers which might be included in a fixed-head or other type of drive include:

1. A serial number register for displaying part or all of the device serial number; and
2. ECC position and pattern registers in drives having error-correcting codes for storing the position of an ECC pattern burst and the pattern itself.

Moving-head magnetic disk memory units normally will incude:

1. An offset register for storing the amount of head offset in a moving head disk memory unit; such a register might also store information for controlling the enabling of header information or error correction circuit;

2. A desired cylinder address register for storing the cylinder address which is to reached; and 3. A current cylinder address register for storing the actual head position over the disk in terms of a disk cylinder.

All operations of a controller and drives in a secondary storage facility constructed in accordance with this invention are under the control of information stored in these registers in the controller (FIG. 6) and the drive (FIG. 7). For example, a transfer of data between the recording medium and a memory unit requires the central processing unit to transfer several items of information into the local and remote registers. The identification of the drive to be involved in the transfer is loaded into the control and status register 134 (FIG. 6). The register 134, in turn, produces corresponding unit select signals. The bus address register 137 receives the initial memory address while the word counter register 136 receives a number (usually in two's complement) defining the number of data words in the block to be transferred.

Once the control and status register 134 contains the drive information, additional tranfers are made to specific remote registers in that drive (FIG. 7). The track and sector address is loaded into the track and sector address register 146. If the disk were a moving-head disk, then other information might be loaded into offset and desired cylinder registers. Still other information concerning the function to be performed would be loaded into the control register 140. As apparent, each of these transfers involves operations for loading information into drive registers from the control section 80 in the device bus 121. Thus, they can be designated "writing" operations.

It is also necessary, from time to time, to retrieve the contents of certain registers to learn the status of the drive and controller (i.e., perform a "reading" operation). For example, the status register 141 contains a DRY bit position which indicates whether the drive is busy. The look-ahead register 148 may be read to determine the actual position of the disk.

Any time there is to be a transfer into or out of a local or remote register, address signals and transfer control signals appear on the system bus 120 shown in FIG. 6 including one set of direction control signals which indicate whether the transfer involves a reading or writing operation. For example, the transfer control signals discussed in U.S. Pat. No. 3,710,324 include CO and C1 direction control signals. CONI and CONO signals discussed in U.S. Pat. No. 3,376,554 perform the same function. When the information is to move into a register, the information may appear on the system bus data lines simultaneously with or slightly after address and transfer control signals appear on the address and transfer control lines, depending upon the characteristics of the particular system.

Receivers 150 in a controller (FIG. 6) comprise buffer or receiver circuits and pass the address and direction control signals to an address circuit 151. Each register has a unique address which the address signals designate and the address circuit 151 uses the address signals to indicate whether the address is for a register in the controller or in an associated drive. Thus, these signals implicitly indicate whether the designated register is a local or remote register and the address circuit 151 produces a corresponding LOCAL or REMOTE signal. Register selection signals (RS') from the circuit 151 pass to a register selection decoder 152 and to a device bus control circuit 160.

A. Local Transfers

When the address signals indicate that a register in the controller is to be selected (i.e., the address circuit 151 generates a LOCAL signal), the decoder 152 subsequently produces a signal which selects both the local register and the direction of the transfer. Each "conductor" from the decoder 152 is really two wires; one wire corresponds to a writing operation; the other, a reading operation. Thus, the decoder produces a "WCin" selection signal when a word count is to be stored in the word counter register 136. To read the contents of the word counter register 136, the decoder would produce a "WCout" selection signal.

Other transfer control signals from the bus 120, usually delayed for some period following the appearance of the address signals, enable the decoder 152 to produce an appropriate selection signal and enable an address timing circuit 155. These transfer signals may be either DATI, DATO, CONI or CONO signals in the system of FIG. 2 or MSYN and SSYN signals in the system of FIG. 3. The address timing circuit 155 produces a delayed DEV SEL signal in response to a first synchronizing signal if the address circuit has validated the incoming address and produced a VALID signal. The DEV SEL signal energizes a timing circuit 156. The timing circuit 156 transmits a REG STR pulse after the appearance of a signal from the decoder 152 and, in a writing operation, loads information on a control data wire 154 into the selected local register. The timing circuit 156 may also couple the DEV SEL signal to the device bus control circuit 160 to produce another transfer control signal on the system bus 120 to indicate that the transfer is complete (when such a signal is necessary for a system operation).

To read the contents of the word counter register 136, for example, the address and transfer control signals cause the decoder 152 to transmit the WCout selection signal. This signal is one input to a multiplexer 162 which selectively couples the output of either the word counter register 136 or the bus address register 137 onto the intermediate bus designated BUSI. Specifically, the multiplexer 162 includes an AND gate 163 which receives the output from the bus address register 137 and an BAout signal from the decoder 152; and an AND gate 164 which receives the output of the word count register 136 and the WCout signal from the decoder 152. An OR gate 165 couples the selected one of the AND gates 163 and 164 onto the BUSI bus and then, through drivers 166, onto the system bus 120.

The multiplexer 162 is shown diagramatically only. In an actual circuit there would be an AND gate associated with each bit position in each of the registers 137 and 136. The BAout and WCout signals would then enable all the AND gates associated with the respective registers.

The drive control path shown in FIG. 6 also contains multiplexers 170 and 172. Multiplexer 170 selectively couples signals onto the BUSI bus either from the output buffer 124 or from the drive coupled from the device bus through receivers 171 in response to OBout or CDout signals from the decoder 152. CS1out and CS2out signals from the decoder 152 control the multiplexer 172 so it selects and couples the output of either the register 133 or the register 134 onto the BUSI bus.

While reading control information from a local register, the device bus control circuit 160 may, if the system requires it, issue another synchronizing control signal which indicates the transfer is complete. Once the REG STR signal terminates and the optional synchronizing control signal appears, the controller and system have completed the transfer(i.e., the selected local register has been read).

The steps for loading information into a local register are similar. The direction control signals from the address circuit 151 indicate a writing operation. Thus, an input conductor for a selected register, rather than a multiplexer, is energized by the decorder 152. When new information is to be stored in the word counter register 136, the decoder 152 produces the WCin signal. The information to be stored appears on the bus 154 which is equivalent to the control data wires 84 in FIG. 4. The coincidence of the REG STR and WCin signals loads the word counter register 136.

Normally the selection signal from the decoder 152 and the REG STR signal from the timing circuit 156 are applied directly to input gating circuits in their respective registers. FIG. 6, however, shows a gating circuit 73 whose output is applied to both the register 136 and a drive word counter register 174. The register 174 stores the number of words transferred between the controller and drive. As shown in FIG. 6, this register is not connected to the BUSI bus, so its contents cannot be read.

Thus, transfers of control information to or from local registers use the same sequence as the transfer of similar information to or from analogous registers in other units connected to an inpu-output bus or a common bus in the two disclosed systems. When the transfer involves a remote register, the controller must route the control information to involve the appropriate remote register. The control information still passes through the controller, but the controller must additionally control each transfer with the designated register.

B. Remote Transfers

When an address on the system bus 120 designates a register in a drive, the address circuit 151 produces a REMOTE signal which is applied to the device bus control 160. In response to this signal the device bus control 160 is enabled to pass the RS' signals from the address circuit 151 to the output drivers 161. The UNIT SELECT signals from the control and status register 134 and the direction control signals are also inputs to the drivers 161.

The appearance of a valid address, with its concomitant VALID signal, and the transfer synchronizing signal from the system bus 120 produces the DEV SEL and the REG STR signals as previously discussed. The DEV SEL enables the output to the device bus drivers 161 to couple the RS', UNIT SELECT, and direction control signals onto wires in the control set 83 of the device bus 121 as RS, DS and CTOD signals respectively. In addition, the REG STR signal causes the control 160 to produce a DEMAND signal which passes through the enabled output drivers 161 as the DEM signal.

Now referring to FIG. 7, a drive selection decoder 175 in each drive compares the incoming DS signals with signals from drive selection switches 176 to determine whether the DS signals identify that particular drive. If they do, the decoder 175 produces an enabling signal on a conductor 177 to activate a register selection decoder 180 and a control section timing unit 181. The register selection decoder 180 receives the RS signals and in response produces signals which are coupled to the selected register in the drive, e.g., registers 140, 141, 142, 144, 145, 146, 147 or 148. These selection signals enable subsequent timing signals from the timing unit 181 to effect a transfer. The timing unit 181 also receives the DEM and CTOD signals from the bus 121 and transfers a TRA signal onto the data set 81 or that the data on the set 81 has been stored.

Referring again to FIG. 6, the device bus control 160 receives the TRA signal and then either enables data to pass through the receivers 171 in response to the CDout signal from the register selection decoder 152, or enables the drivers 182 if the decoder has produced the CDin signal. In addition, the control 160 can produce the previously discussed optional synchronizing signal for controlling the transfer between the system and the controller. Thus, the decoder 152 produces a CDin or CDout signal during each remote register transfer.

A more thorough understanding of these remote register transfers will be obtained from a discussion of reading and writing operations in some detail in terms of the signal transfers between the controller in FIG. 6 and the registers in FIG. 7.

1. Reading Operation

Figure 8:
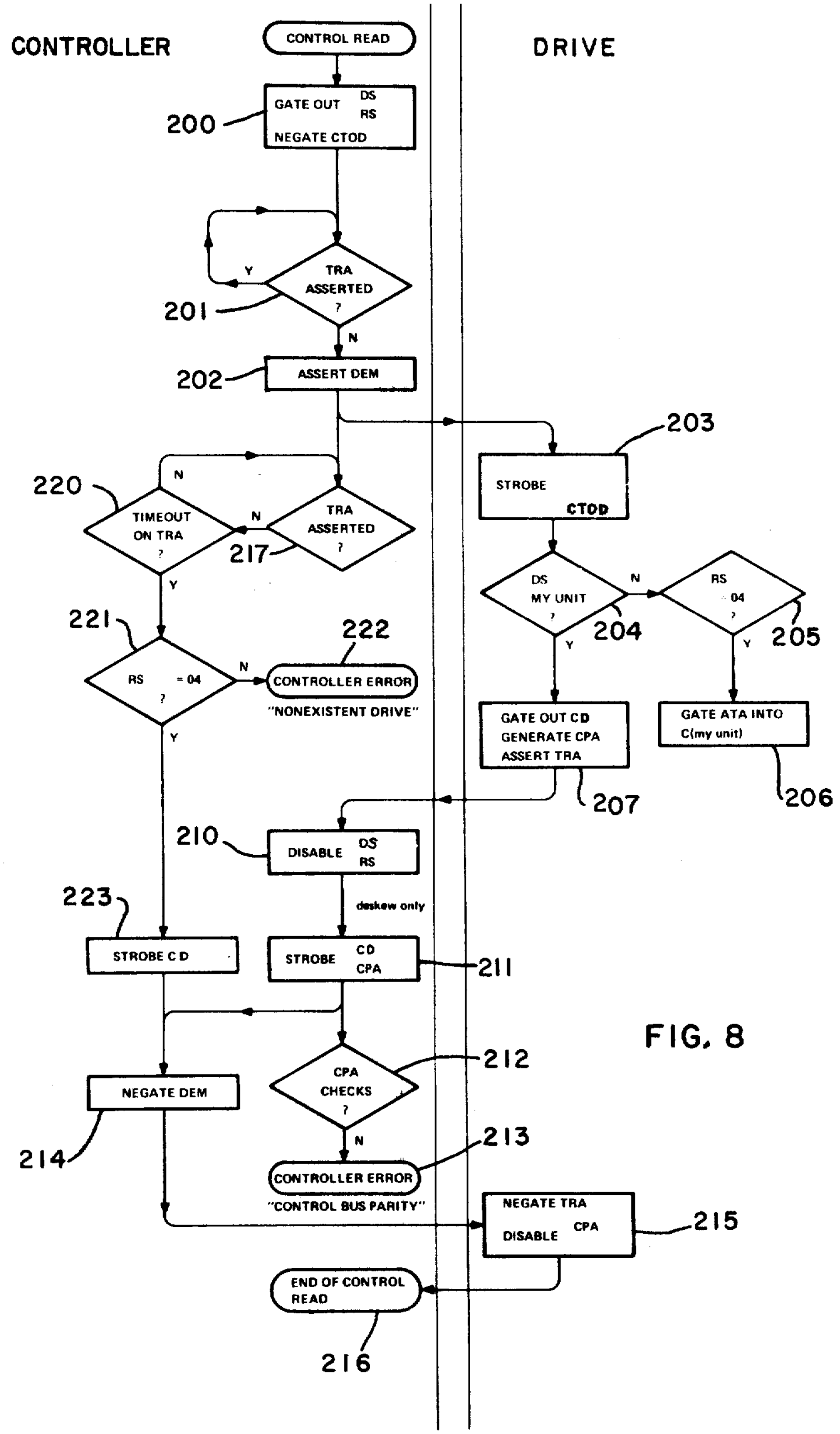
FIG. 8 is a flow chart of the operation for retrieving information in a register shown in FIG. 7.
Figure 9:
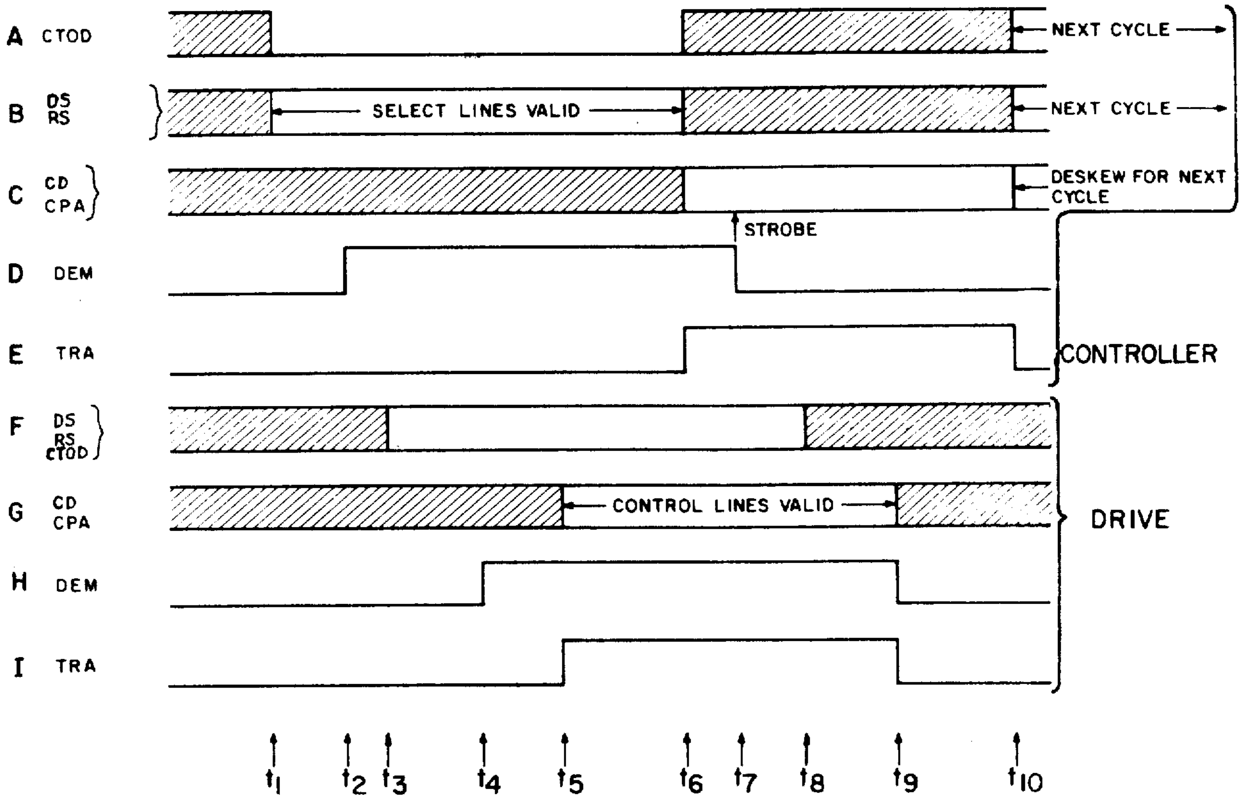
FIG. 9 includes timing charts corresponding to FIG. 8.

FIG. 8 is a flow chart of the steps necessary to read control information in a remote register while FIG. 9 illustrates the timing of such signals. Step 200 and Charts 9A and 9B represent the process of placing the appropriate values of the DS, RS and CTOD signals onto the device bus 121 from the output drivers 161 shown in FIG. 6 at time t1. If a TRA signal from a previous transfer with any drive connected to the controller is asserted, the controller waits for it to terminate as represented by step 201. At the completion of this interval, step 202 and Chart 9D indicate that the device bus control 160 and the output drivers 161 couple the DEM signal onto the device bus at time t2.

Now referring to FIGS. 6, 7, 8 and 9 the signals on DS, RS and CTOD wires from the controller arrive at the drive at time *t*3 (Chart 9F), the interval from *t*1 to *t*3 representing a bus signal propagation delay. After a similar delay from time *t*2, the DEM signal is received at the drive at time *t*4 (Chart 9H) causing the control section timing unit 181 to load (or strobe) the CTOD signal as represented by step 203. The drive selection decoder 175 will have already determined whether the drive is the selected drive. If the DS signals do not designate the drive (step 204), the drive in step 205 determines whether the RS bits designate the attention summary register. If a register other than the attention summary system is designated, but the DS bits do not select a drive, no further steps occur in that drive. If the attention summary register is addressed, then the ATA signal is transmitted onto a predetermined one of the control data (CD) wires 84.

Assuming that the DS signals identify the drive in FIG. 7, the control section timing unit 181 at time *t*5 loads the information from the selected register onto the control data lines in the bus 121 as disclosed in step 207 and Chart 9G. At the same time control bus parity circuit 183 generates a parity bit which is loaded onto the CPA wire 85 and the unit 181 transmits the TRA signal at time $t5$ as shown in Chart 9I.

When the controller receives the control information and the TRA signal as shown in Charts 9C and 9E at $t6$, the device bus control 160 may immediately disable the DS, RS and CTOD signals (Charts 9A and 9B and step 210). After a short delay, the device bus control 160 opens the receivers 171 at time $t7$ to load the control information and parity signal from the device bus 121 through the multiplexer 170 and drivers 166 onto the system bus 120 (Step 211). When the system receives the control information, the control 160 terminates the DEM signal (Chart 9D and step 214) so that the drive senses the transition of the DEM signal (Chart 9H) and terminates the TRA signal (Chart 9I and step 215) and the control data and parity signals. Once the controller senses the termination of the TRA signal at time $t10$ (Chart 9E), the transfer is complete (step 216).

As apparent, the control information at the receivers 171 in FIG. 6 is valid from time $t6$ to time $t10$ (Chart 9C). The TRA signal can therefore be used to synchronize operations on the system bus 120 and the device bus 121.

Referring to FIG. 8, once the controller transmits the DEM signal in step 202, it begins timing a response interval. This is represented by steps 217 and 220. If the drive transmits the TRA signal before the predetermined time interval expires, the interval timing operation terminates in step 217. If not, the controller, at the end of this interval determines whether the attention summary register 145 is being read (step 221). If it is not, then no device has responded and a non-existent drive has been designated. Thus, step 221 branches to step 222, and the controller sets an NED bit position described later in the control and status register 134 (FIG. 6). If the attention summary register 145 has been addressed, step 221 branches to step 223, and all the information on the data set 81 is read before terminating the DEM signal at step 214.

If a parity error is discovered in step 212 during a transfer of information from a drive (step 211), step 213 causes an MCPE bit position in the status and control register 133 to be set.

2. Writing Operation

Figure 11:
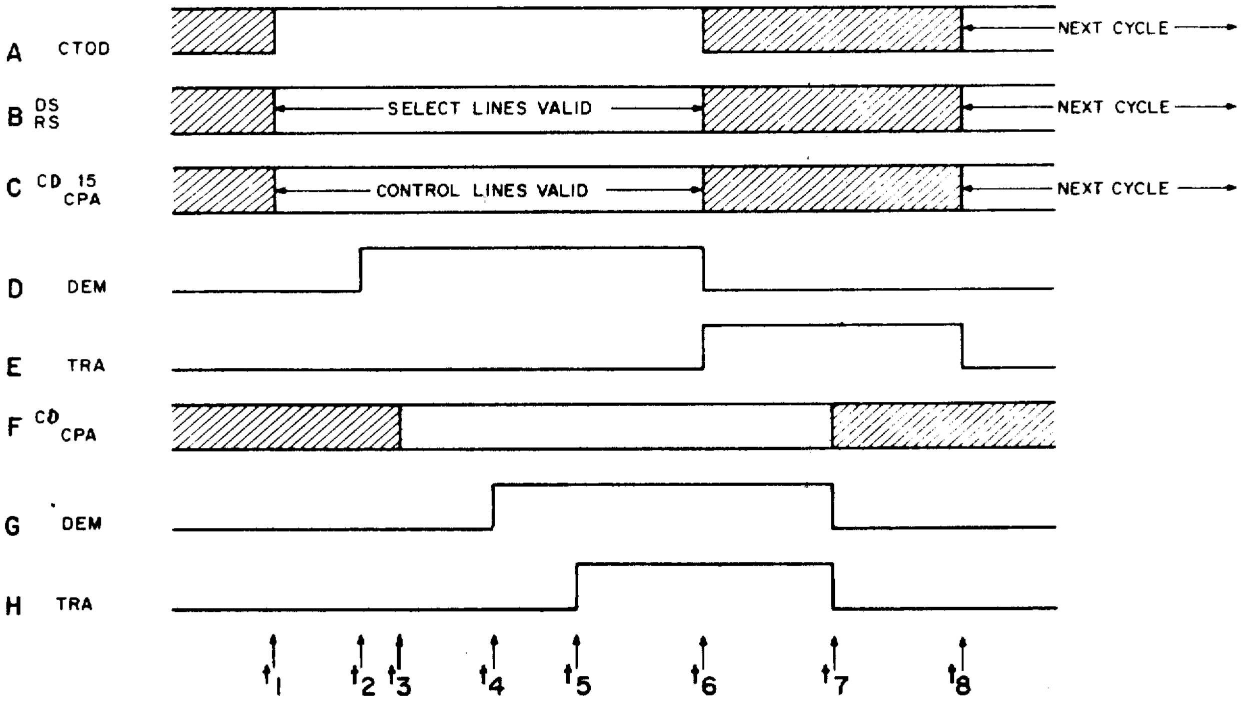
FIG. 11 includes timing charts corresponding to FIG. 10.
Figure 10:
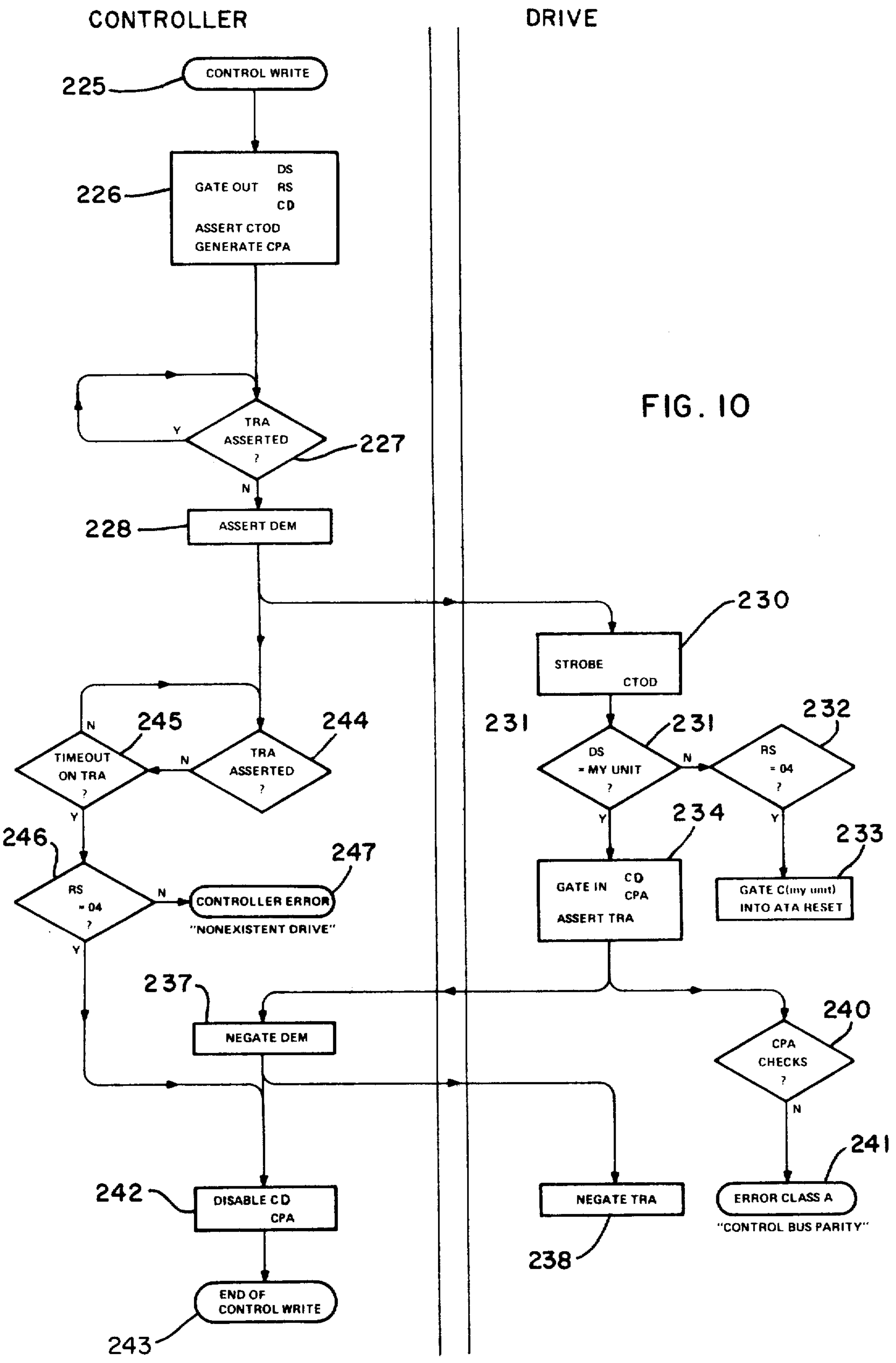
FIG. 10 is a flow chart of the operation for storing information in a register shown in FIG. 7.

FIG. 10 is a flow chart for writing control information into a remote register while FIG. 11 is a corresponding timing diagram. When the controller receives a command to write control information (step 225) it transfers DS, RS and CTOD signals onto the control information lines and a parity signal onto appropriate wires in the control section 80. This occurs at step 226, which corresponds to time t1 as shown in Charts 11A, B and C. The control information passes through the drivers 182, shown in FIG. 6, under the control of a gating signal from the device bus control 160, which responds to the DEV SEL signal as previously discussed. The control signals pass through the output drivers 161.

If a TRA signal from a previous transfer with any drive connected to the controller is still asserted, the controller waits for it to terminate as shown in step 227 and discussed with respect to the reading operation. Then at time $t2$ the controller, in step 228, transmits the DEM signal onto the device bus 121 as shown in Chart 11D. Steps 230, 231, and 232 are analogous to steps 203, 204 and 205 in FIG. 8. The control information on the data set 81 arrives at the drive at time $t3$ (Chart 11F) and the DEM signal arrives at time $t4$ (Chart 11G). In response to these signals, the control section timing unit 181 in the drive (FIG. 7), in step 234 and at $t5$ in Chart 11H, loads the control information into the designated register and the CPA signal into the parity circuit 183. In steps 240 and 241, the circuit 183 provides a parity error signal if an error exists to set a PAR bit position in the error register 142.

At $t5$ the drive also transmits the TRA signal (Chart 11H), which arrives back at the controller at $t6$ (Chart 11E). In response, the device bus control 160 turns off the drivers 182 and the output drivers 161 thereby effectively disconnecting the controller and drive by terminating all signals from the controller on the device bus at t6 as shown in Charts 11A, B and C and including the DEM signal (Chart 11D). At $t7$, Chart 11F shows that the control information and parity signal from the controller or the data set 81 terminate at the drive as does the DEM signal. Thus, at $t7$ the drive terminates the TRA signal (Chart 11H) and the controller senses this termination at t8 (Chart 11E). This completes the writing operation and permits initiation of another cycle.

Now referring to FIG. 10, after the controller asserts the DEM signal in step 228, it starts timing a response interval like that in a reading operation. Steps 244, 245, 246 and 247 are analogous to steps 217, 220, 221 and 222 in FIG. 8. If the attention summary register 145 is being loaded, then the information remains on the control data (CD) wires 84 until the end of the time-out period. The controller then completes the writing operation by removing the control information in step 242 to complete the operation with step 243.

C. Local and Remote Registers

Local registers in the controller and remote registers in the drives store control or status information. Some registers, such as the word counter register 136, contain one item of information, such as the word count, so all bit positions or stages are interrelated. Other registers store diverse information in one or more groups of registers. For example, the control and status register 133 has a stage for indicating special conditions and another stage for indicating that a transfer related error has occurred. Registers in which all stages are interrelated may be arranged so either data can only be retrieved from them by the system (i.e., read-only register) or data can be retrieved or altered in them by the system (i.e., read/write register). Registers in the former category are denoted by a cross to the right of the designation in FIGS. 12 and 13. In registers which contain independent stages, each stage may be arranged so its data either may only be retrieved (i.e., a read only stage) or may be retrieved or altered (i.e. a read/write stage). A cross above a stage indicates that it is a read-only stage.

The particular assignment of bit positions or stages made in the following discussion of local and remote registers is for purposes of explanation only. Other assignments may be made. Further, certain of the defined stages and the information they represent may be omitted and other stages representing other information may be substituted or added.

1. Control and Status Register 133

Figure 12:
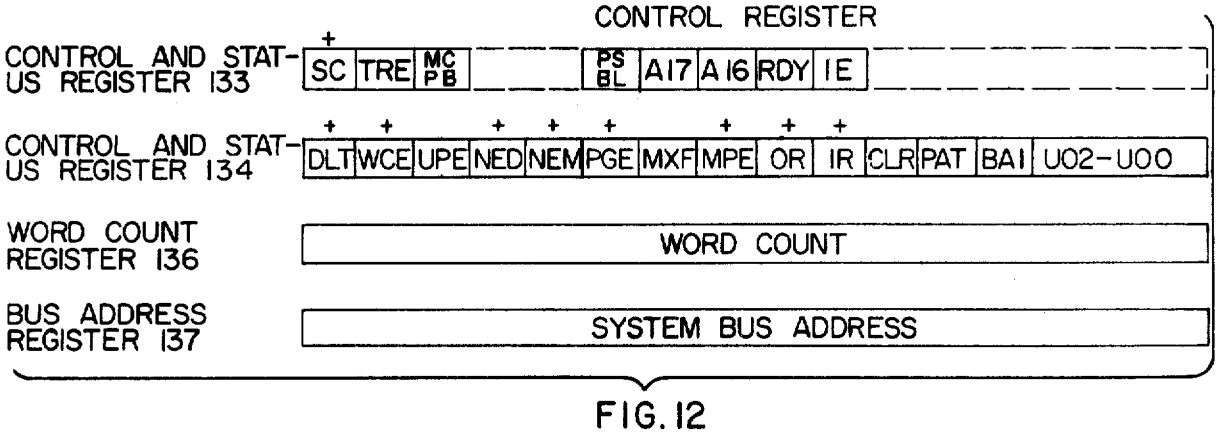
FIG. 12 depicts the organization of registers adapted for use in a controller.

The control and status register 133 is a multi-stage or multiple bit position register. Some stages are located in the controller; others are located in each drive. The controller stages are shown in FIG. 12. One such stage is an SC stage which is set to indicate that (1) a transfer related error has occurred (i.e., a TRE bit position is set), (2) that an MCPE bit position has been set because a parity error was detected during a remote register reading operation as previously discussed, or (3) that some drive connected to the controller has produced an ATTN signal on the wire 94 in the control set 83 (FIG. 4). The controller resets the SC bit position in response to a system resetting (INIT) signal on the wire 95 in the control set 83, to a controller clearing signal which sets a CLR bit position in a control and status register 134 or in response to the correction of the condition causing the drive to assert the ATTN signal. This stage is located in the controller itself.

The TRE stage is a read/write stage in the register 133. It is set in response to the occurrence of a transfer related error signalled by certain stages in the control and status register 134 or in response to the simultaneous assertion of EXC and EBL signals on the wires 110 and 111 in the control set 104. The previously discussed INIT and CLR signals can reset the stage. In addition, the system can clear the TRE bit position by means of a local register writing operation.

As previously indicated, the controller checks the parity signal on the wire 85 in the data set 81 (FIG. 4). If a parity error is detected, the MCPE bit position is set. The MCPE stage is a read only stage. Both INIT and CLR signals cause it to be cleared. A local register writing operation may also clear this stage.

A PSEL bit position is used when the synchronous data path can be selectively coupled to either of two system buses. It is cleared when the selected system bus is also the bus which connects to the control data path. When this stage is set, data is routed to the other system bus. An INIT or CLR signal or a local register writing operation will clear the stage to thereby restore the connection between the system bus which connects to the control data path.

The control and status register 133 shown in FIG. 12 also contains A17 and A16 bit positions which are read/write stages. These positions can augment the contents of the bus address register 137 if the address is not sufficient to uniquely identify a location. Either the INIT or CLR signal or a local register writing operation can clear these two bit positions.

A RDY bit position indicates the condition of the synchronous data path in the controller and comprises a read/write register stage. It sets when power is applied and at the completion of each transfer operation over the synchronous data path. Whenever a data transfer function is received in the register 133 with the GO bit set, the RDY stage is reset.

An IE bit position is set by a local register writing operation to cause the controller to interrupt the system connected to the system bus 120 in response to the assertion of a RDY or ATTN signal. It enables other controller circuits to respond to various error conditions or to the completion of an operation to produce an interrupting signal. This bit position is reset when the system interruption circuitry recognizes the interruption or in response to an INIT or CLR signal. If a local register writing operation resets this stage, the controller can not interrupt the system and any pending interruptions are cancelled.

Several FUNCTION signals designate a specific operation the drive is to perform. They are received by the controller, although the corresponding register stages are located in the drives. These signals define various functions which may involve a data transfer. The register stages are cleared by an INIT or CLR signal. A DRIVE CLEAR operation defined by the FUNCTION bits causes the stages to be cleared. Typical FUNCTION signals also produce the previously discussed READ, WRITE and WRITE-CHECK operations or a SEARCH operation to locate a particular area in the drive without a data transfer taking place.

When a GO bit position in the register 133 is set, the drive performs the operation identified by the FUNCTION bits. The INIT signal will clear the GO bit and abort any operation in response to a command. The GO bit is also cleared when an operation over the synchronous data path is completed. Setting the GO bit also can reset various error condition bit positions as discussed below.

2. Control and Status Register 134

All stages in the control and status register 134 are located in the controller. Individual register stages reflect the operation and status of the controller, especially error conditions which might exist. A DLT bit position is one example of such a stage which is set when the controller is not able to supply or accept in a timely fashion a data word over the synchronous data path during a writing or reading operation, respectively. In a two-port operation when the PSEL stage in the system 133 is set, an INIT signal at the second system bus also sets the DLT stage if a transfer is then occurring over that second bus. Any time the DLT stage sets, the TRE stage in the register 133 is set.

A WCE bit position is set during a WRITE CHECK operation when the recorded data from the drive does not match the corresponding word in a memory location in the system. This stage sets the TRE stage in the register 133.

A UPE bit position is set during a data transfer in response to a WRITE or WRITE-CHECK command over the synchronous data path when a parity error is detected on the system bus 120. The TRE stage also sets in response to such a parity error.

An NED bit position indicates a non-existent drive and is set by the controller as described with reference to FIGS. 8 and 10. This also causes the TRE stage to be set.

If a system location specified by the controller does not exist, the controller senses an incompleted transfer operation and thereby sets a NEM bit position and the TRE stage.

When the system sends a READ, WRITE or WRITE-CHECK command while the controller is already involved in another transfer, the controller sets a PGE bit position in the register 134. This causes the TRE stage to set.

Any time a drive does not respond to a data transfer command within a predetermined time, the controller sets MXF and the TRE bit positions.

An MPE and the TRE bit positions set if the controller detects a parity error during a transfer over the device bus in response to a READ or WRITE-CHECK COMMAND.

All the foregoing stages in the register 134 can be cleared by any one of four procedures. First, a system resetting signal clears the stages. Secondly, the system can issue a clearing command to set the CLR bit position as discussed later. Thirdly, the system can load the register 133 with the combination of FUNCTION bits which designate a data transfer operation and set the GO bit position. Finally, a word can be loaded into the register 133 which clears the TRE bit position. In addition, the UPE and MXF bit positions can be cleared directly by introducing a local register writing operation.

As described later, OR and IR bit positions in the register 134 are used in diagnostic operations and are set when the output buffer register 124 or the input buffer register 122, respectively, in the synchronous data path are empty. A system resetting signal, a local register writing operation to set the CLR bit, or an operation for reading the information in the respective buffers clears the OR stage or sets the IR stage.

Sometimes it is desirable to use either even or odd parity coding during a transmission over the data paths. A PAT bit position in the status register 134 can be set to produce even parity coding and decoding and reset to produce odd parity operations. A local register writing operation alters the state of the stage.

Normally the bus address register 137 is incremented or altered during each transfer to identify system locations in succession. A BAI stage in the register 134 can be set during a local register writing operation to inhibit the incrementing steps, provided the controller is not then involved in a data transfer. This condition is indicated when the RDY stage is set. Either a system resetting signal or CLR signal can clear the BAI stage.

The UO2 through UO0 bit positions receive their information during a local system writing operation. These stages are cleared in response to a system resetting signal or to a CLR signal. Once a transfer starts, they can be altered without interfering with the transfer.

3. Word Counter Register 136

The word counter register 136 initially stores the initial word count, i.e., the number of words to be involved in a data transfer. The number stored is usually the two's complement of the actual word count and the register, which is a counter, is incremented during each transfer of a word over the synchronous data path between the controller and the system. When the register 136 reaches ZERO (i.e., the register overflows or issues a CARRY), the requested transfer is finished. This register can only be cleared by transferring a ZERO value to it through a local register writing operation.

4. Bus Address Register 137

Locations in the system from which data is retrieved or to which data is sent over the synchronous data path are identified by the bus address register 137. The A16 and A17 bit positions in the register 133 augment this information as noted above. The register 137 is a counter which is incremented in response to each data word transfer in order to identify the successive locations corresponding to the successive words involved in a transfer operation. Either a system resetting or CLR signal clears the register 137.

5. Data Register 135

Data register 135 can be addressed, primarily for diagnostic purposes as previously indicated. There may be no physical register, although one is represented in FIG. 12. Specifically, if the data register is addressed during a local register writing operation and the IR signal indicates that the storage facility 123 is not full, the information in the control data wires 84 is loaded into the input buffer 122 (FIG. 6). This condition is represented by an OBin signal. On the other hand, an OBout signal is produced when the data register 135 is addressed during a local register reading operation and OR signal indicates that data is present. The OBout signal causes the information in the output buffer 124 to be loaded onto the system bus 120.

6. Control Register 140

Figure 13:
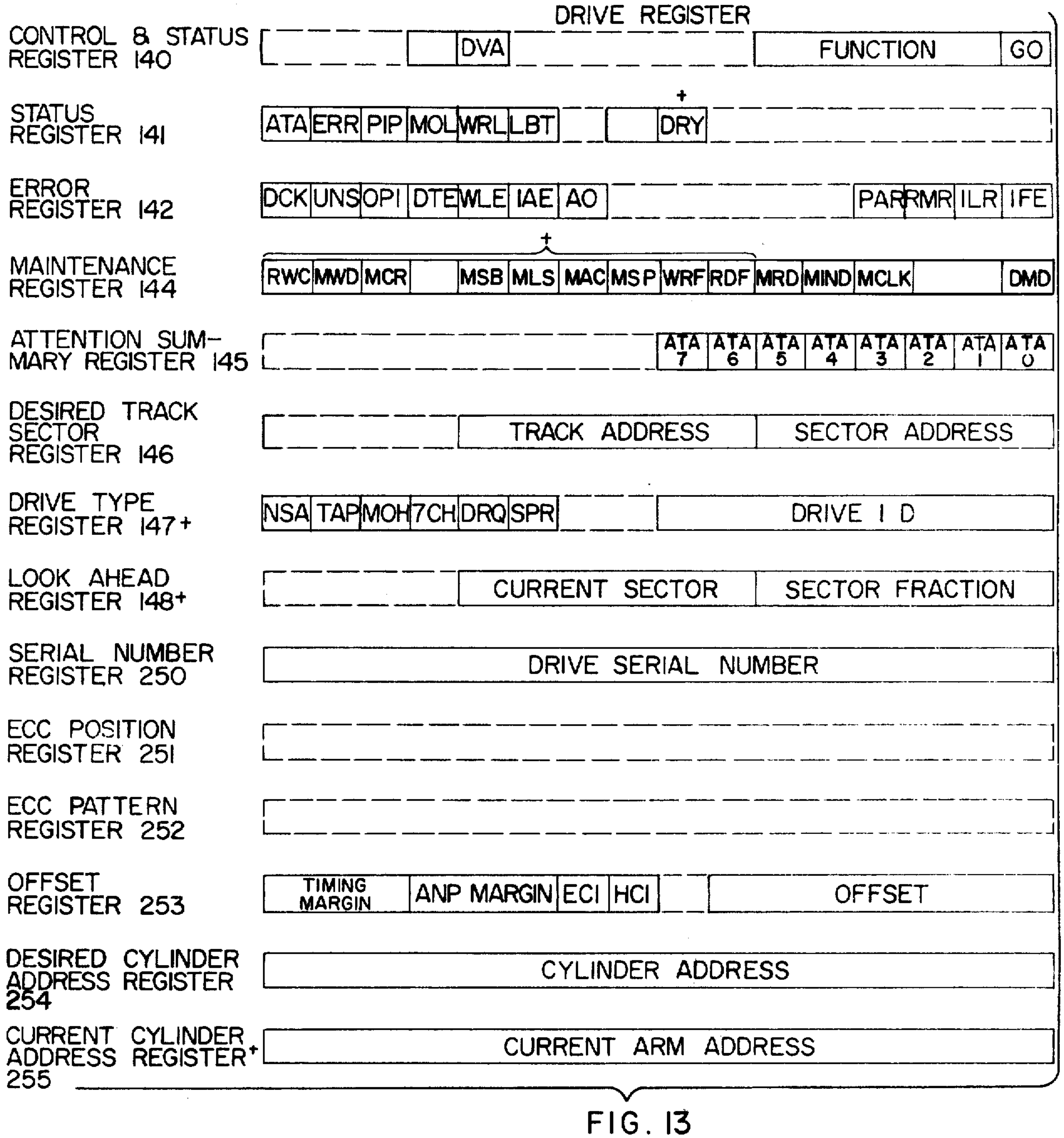
FIG. 13 depicts the organization of registers adapted for use in a drive including a maintenance register which is useful in this invention.

Now referring to FIG. 13, which contains, in diagrammatic form, the organization of typical registers in a drive, the control register 40 stores the FUNCTION and GO bits previously described with respect to the control and status register 133. Whenever the register 133 is loaded, the controller produces a remote writing operation to load FUNCTION and GO bits into corresponding stages in the designated drive. A stage is set whenever the drive is available for operation and is a read-only position.

7. Status Register 141

The status register 141 contains the status of the drive. The contents of any bit position in the register 141 are dependent only upon monitoring circuits within the drive. This register cannot be loaded from the controller.

Within the register 141, an ATA bit position and an ERR bit position are related. The ERR bit position is set whenever any other stage in the error register 142 sets. This, in turn, sets the ATA bit position in the drive, which is also set whenever operations in response to a SEARCH command are complete. Other systems resetting or CLR signals will clear the ATA and ERR stages. It is also possible to clear the ATA stage by clearing the corresponding location in the attention summary register 145 as described later or by using a local writing operation to transfer a new command to the drive which sets the GO bit position. The last two methods do not clear the error indicators themselves.

Whenever an operation in response to a SEARCH command is in progress, a PIP stage is set. Seeking operations, as apparent, are applicable only to a moving-head disk memory or equivalent units. Once the operation is completed, this stage is cleared.

Still referring to the register 141, MOL and DRY stages are set when the drive is in an operating condition; that is, the MOL stage is set when the drive power is on and, in the case of a continuous moving medium such as a disk or drum, the medium is up to speed. The DRY stage is set to indicate that the drive can accept a command while the drive is not in an operating condition; the DRY bit position is cleared in response to a data transfer command with the GO bit position set. Any change of state of the MOL stage also causes the ATA stage in the drive to be set.

A WRL stage is set whenever an address in the desired track/sector register 146 identifies a track which is protected against writing operations. Otherwise, this stage is cleared.

An LBT bit position is set in response during a transfer over the data set 101 (FIG. 4) to or from the highest sector (i.e., the "last" sector) on a drive. This stage can be cleared by a system resetting or CLK signal, by transferring a new address into the register 146 or by clearing the drive.

8. Error Register 142

Now referring to the error register 142, a DCK bit position is set whenever circuitry in the drive detects an error during a reading operation over the data set 101 in response to a READ or WRITE-CHECK command.

If the power supply voltage for the drive falls below a safe level, a UNS stage sets; it is reset only when the supply voltage is above the minimum safe level.

During a data transfer operation circuits in the drive monitor index marks on the medium. If some number of index marks (e.g., three marks pass after a data transfer command and the RUN signal is still absent, an OPI stage is set indicating a controller failure. In a disk unit, the passage of the number of index marks signifies more than two disk revolutions. If a SEARCH command does not terminate within two disk revolutions, a drive failure has occurred and the OPI stage is also set.

The occurrence of any timing fault, such as the loss or addition of index or clock pulses, causes a DTE stage to set.

If the WRL bit position in the register 141 is set and a writing operation is attempted, the drive sets a WLE stage.

A remote transfer which loads a non-existent address into the desired address register 146 causes the drive to set a IAE stage.

An AO bit position is set if, when the last block of the last track of a disk is read, the word counter register 136 in the controller does not indicate that the transfer is finished.

Any time a parity error is detected, either on the synchronous data path or the asynchronous control path, a PAR stage in the error register 142 sets.

If the GO bit position in the register 140 is set and the system attempts to load the control register 140, the error register 142 or the desired address register 146, an RMR stage sets.

Whenever the register selection (RS) signals do not identify a register in a designated drive, the drive sets an ILR stage.

FUNCTION bits which define an operation that the drive cannot perform cause an ILF bit pösition to be set.

The error stages are set immediately upon the condition being detected. This may result, in some cases, in an immediate interruption of the system, or in an interruption at the end of the complete transfer. In either case, the drive asserts the ATTN signal at the appropriate time to initiate the interruption. With the exception of the UNS stage, the other stages can be cleared by a system resetting signal or CLR signal or in response to a remote register writing operation designating the register 143. In addition, a DRIVE CLEAR command code sent to the register 140 clears the corresponding stages in the designated drive.

9. Maintenance Register 144

In accordance with this invention, the maintenance register 144 facilitates diagnosis. FIG. 13 illustrates a number of bit positions which are particularly adapted for use in a fixed head magnetic disk drive in which only one side of the medium stores data. Changes in bit position assignments can be made for other disks or system elements are appropriate.

Referring specifically to FIGS. 7 and 13, an RWC bit position is conditioned in response to a signal which clocks a shift register 270 for converting data between a serial format useful in a disk and a parallel format useful in transfers over a drive bus.

An MWD bit position represents a data bit which, during a normal writing operation, would have been transferred onto the medium.

If a drive contains cyclical redundancy checking circuits, an MCR bit position indicates the point in the operation during which a CRC word is retrieved or is written.

Whenever data is to be transferred into a data buffer 273 during a writing operation, a format counter 272 produces an SB signal. An MSB bit position in the maintenance register 144 monitors the state of the SB signal during diagnostic operations.

When data is being transferred to the drive, an LSR signal from the format counter 272 loads the data in parallel from a data buffer 273 into the shift register 270. An MLS bit position in the maintenance register 144 monitors the LSR signal.

When there is an identity between the number of the sector in the address register 146 and that in an address counter 266, a sector address comparison circuit 267 produces an AC signal. The output from an MAC bit position in the maintenance register 144 corresponds to the AC signal.

A timing signal generator 265 clocks and thereby advances the sector address counter with SP pulses which occur once each sector. An MSP bit position in the maintenance register 144 monitors the output of the circuitry which produces the SP pulse.

Signals from the control register 140 and from other circuitry in the drive identify whether a transfer into the control register 140 designates a reading or writing operation. The decoding circuitry associated with the control register 140 is also monitored to condition WRF and RDF bit positions in the maintenance register 144 during writing or reading operations.

All the foregoing stages in the maintenance register 144 are not affected by a remote register writing operation designating the maintenance register 144. There are, therefore, "read-only" stages. However, the remaining bit positions can be altered. For example, successive remote register writing operations change the state of an MRD stage. During diagnostic operations this stage replaces circuitry in the drive control circuit 262 and the drive transport medium 263 in FIG. 7 which normally supplies data during a reading operation.

Disk units normally contain some means for producing an index pulse during each revolution of the medium. During diagnostic operations, an MIND bit position in the maintenance register can be set and cleared to simulalte the index pulse. Internal timing signals are obtained from a timing track on the medium or other sources in other elements. During diagnostic operations these sources are isolated, so an MCLK bit position is alternately set and cleared to simulate these timing pulses.

The state of a DMD bit position controls whether the drive is on a diagnostic mode. As described in more detail later, during this mode certain portions of the drive circuit are isolated and simulated timing, index and data signals are supplied to the maintenance register to be substituted for corresponding signals which appear during normal operations.

10. Desired Track/Sector Address Register 146

In the track/sector register 146 TRACK ADDRESS and SECTOR ADDRESS bit positions identify, respectively, the track and sector on a disk to be involved in a transfer. In a fixed-head unit, the TRACK ADDRESS bits identify a specific head. The register 146 can be incremented by successive sector pulses so that successive sector and tracks can be involved in a transfer. When the last track and sector address allotted to any specific drive have been identified, the LBT stage in the status register 141 is set. The contents of the register 146 can be reset in response to system resetting or CLR signal or a DRIVE CLEAR command.

11. Drive Type Register 147

The drive type register 147 contains preset values to identify the nature of the drive. It might contain, for example, an NSA bit position to indicate a drive which does not use sector addressing or a TAP bit position to indicate a tape, rather than disk, drive. An MOH bit position can indicate whether a disk is a moving head disk while a 7CH bit position indicates, on a tape unit, whether the tape had seven or nine channels. A DRQ stage could indicate that a drive connects to two controllers. Sometimes a given drive might have a slave drive and an SPR bit position could indicate the presence of such a drive. DRIVE ID bit positions might identify the drive type and major variations.

12. Look-Ahead Register 148

The look-ahead register 148 is a counter which contains the sector address of the sector currently passing beneath the read/write heads in CURRENT SECTOR stages. SECTOR FRACTION stages are incremented periodically to identify the fractional portion of the sector which has passed the heads. This information can be used in reducing disk latency times to thereby improve disk transfer rates.

The remaining registers shown in FIG. 13 are not necessary for the operation of a fixed head disk unit such as shown in FIG. 6. They are, however, useful in the operation of other drives and may be incorporated in them.

13. Drive Serial Number Register 250

It may be desirable to include a drive serial number register 250 in magnetic tape drives or drives with removable disks. The contents of the register will then identify the drive unit during regular operation or during maintenance operations. The contents might be recorded in binary coded decimal notation.

14. Error Correction Code Register 251 and 252

The function of the ECC position and the ECC pattern registers 251 and 252 shown in FIG. 13 has been discussed previously. The use of these registers with error-correcting code drives is known. The position and pattern are stored directly in the respective registers. They can be read through a remote register reading operation.

15. Offset Register

FIG. 13 also shows an offset register 253. TIMING MARGIN and AMP MARGIN bit positions are useful in providing timing and amplitude offsets for various operations. If an ECI bit position is set and the drive has an error-correcting code function, the function is inhibited. Similarly, setting an HCI bit position inhibits header comparison circuits. OFFSET bit positions contain the actual offset value to provide a proper incremental positioning of the read/write heads over the medium.

16. Desired and Current — Cylinder Address Registers 254 and 255

Two other registers useful in moving head disk memory units are a desired-cylinder-address register 254 and a current-cylinder-address register 255. The drive moves the heads to the track identified in the desired-cylinder-address register 254 and then transfers the contents of the register 254 into the current-cylinder address register 255. The register 255 then identifies the actual head position and is useful, for example, in determining the relative times necessary to move the heads from a current position to other positions.

17. Attention Summary Register 145

A status register 141 in each drive contains an ATA stage as previously described. The information in this stage can be transferred into the data set 81 during a remote reading operation in which the register 141 is identified. Each ATA stage in each register is a stage in the attention summary register 145 which has its own remote address. That is, within the register 145 there is a correspondence between the position of each stage (i.e., the wire in the control data wires 84 which receives the output of the ATA stage) and a drive, each ATA stage being coupled to a unique wire when the attention summary register is read.

Whenever any stage is an error register 141 sets, for example, its corresponding ATA stage sets. This causes the drive to issue an ATTN signal onto the common ATTN wire 94 to thereby caause system operations to be interrupted. One of the first operations in the ensuing interruption routine is the reading of the attention summary register 145. This reading operation is essentially the same as shown in FIG. 8. In this specific operation, however, the address circuit 151 produces RS' signals with a value of $04_8$, and the RS signals from the output drives 161 have the same value. The controller performs steps 200 through 202 as shown in FIG. 8. After a delay, the signals are received by all the drives on the device bus. Now each drive uses step 204 to branch to step 205 because the DS signals have no meaning. As the RS signals identify register $04_8$, step 205 causes step 206 to transfer the output of the ATA stage in each drive status and control error register 141 onto a corresponding wire in the data set 81 sometime after the DEM signal arrives. Then each drive transmits its TRA signal and the controller receives all of these after some time interval. Several different signals may be received; however, the controller, while processing them, disables step 217 so the controller timing internal is completed. Then, in step 221, the controller branches to step 223 and reads the data thereby transferring the ATA signals from all drives to the controller. This is also the time that the controller may terminate the DEM signal as shown in step 214. Then the control information is removed and the drives all terminate their respective TRA signals. The reading operation then is completed, as previously described. Thus, when the reading operation is completed, the system "knows" exactly which drive or drives sent ATA signals and can immediately begin reading their respective error registers or other registers without any intervening polling operations.

Once all thee interrupting drives have been serviced, it is necessary to reset each of the respective ATA stages. This may be done with a writing operation which is similar to that shown in FIG. 10. Step 226 loads an appropriate CTOD signal, RS signals with a value $04_8$ and the control information including a parity bit onto their respective wires in the control section 80. Then the DEM signal is loaded onto the bus (step 226). After the first control signals and the DEM signal are received, each drive responds by transmitting a TRA signal. An ATA stage in each error register also resets if a corresponding signal on a control data wire 84 is asserted. Again, the controller awaits the completion of a time interval because, in step 240, the controller senses the value of the RS signals. After a delay the control signals and control data signals are terminated by the controller and the cycle is completed as in a normal remote register writing operation.

IV. Synchronous Data Path

All the foregoing transfers to local and remote registers are in the nature of "overhead" transfers which provide the necessary control and status information to effect a transfer of data between the system connected to a system bus and a drive connected to the device bus. Certain operations in response to FUNCTION bits loaded into the control and status registers 133 and 140 (FIGS. 6 and 7) do not involve data transfers. These are summarized later. As previously discussed, there are three basic operations which do involve such data transfers and which are known as data transfer commands. They include a reading operation which transfers data from the drive into the system, in response to a READ command, a writing operation which transfers data from the system into the drive in response to a WRITE command and a write-check operation during which data stored in the drive and corresponding data in the system are compared to determine whether there were any writing errors in response to a previous WRITE command.

Figure 5:
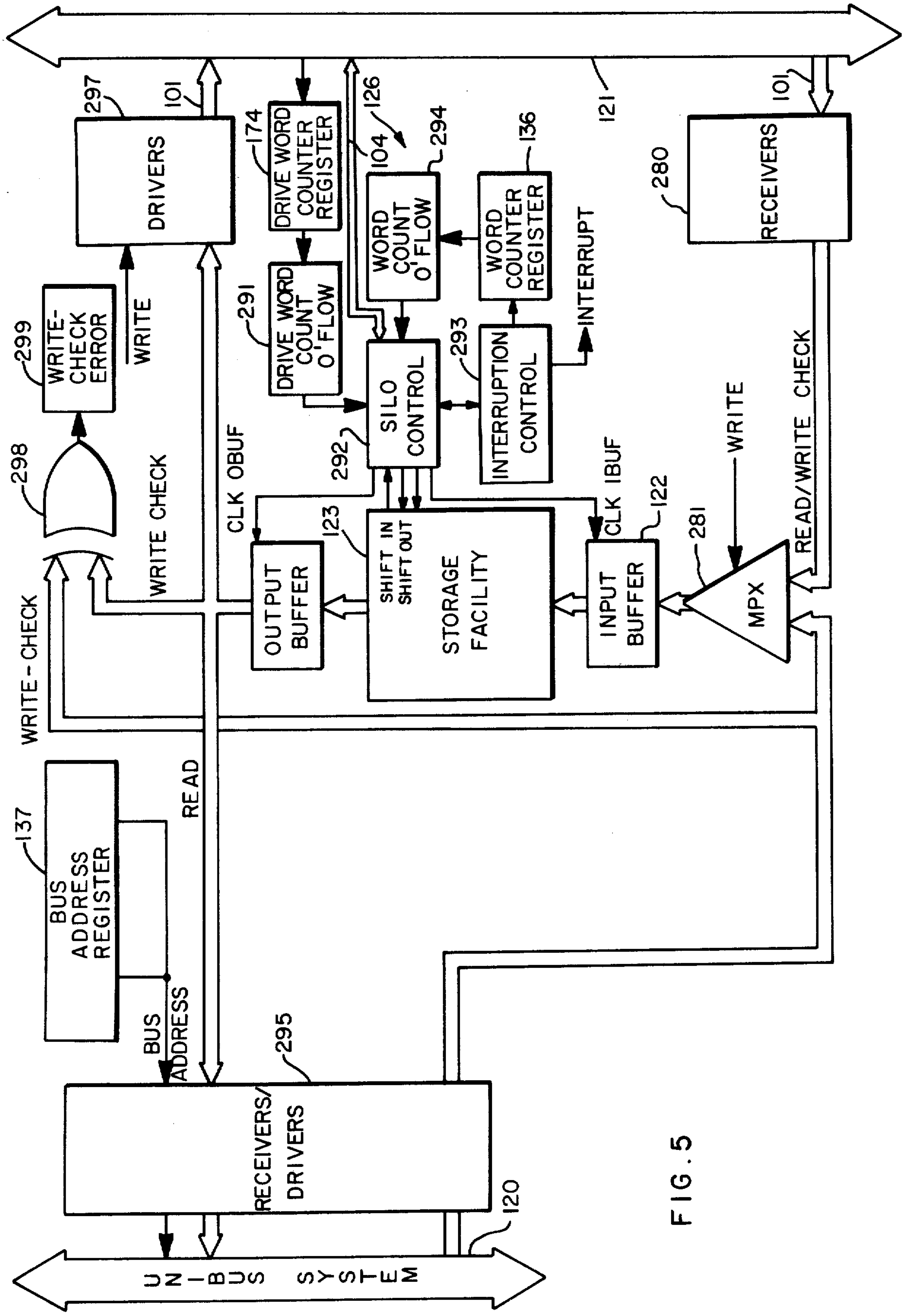
FIG. 5 is a block diagram of a synchronous data path in the controller as adapted for connection to a system as shown in FIGS. 2 or 3.

There are, as previously indicated, several preliminary drive control path transfers which precede the issuance of any of these data transfer commands. The starting system address must be loaded into the bus address register 137 in the controller (FIGS. 5 and 6). For purposes of this explanation, it is assumed that the A16 and A17 bit positions in the control and status register 133 (FIG. 12) are included in the register 137 as described above. Both the word counter register 136 and the drive word counter register 174 receive a number representing the total number of words to be transferred. The address register 146 in FIG. 7 will contain sector and track addresses and a moving-head disk will contain the desired track address in the desired-cylinder-address register 254. Once this information has been received by the controller and the designated drive, the system can issue a data transfer command through a register writing operation.

In order to understand the operation and advantages of this invention, it will be helpful to understand, in detail, the operation of a specific drive during a synchronous transfer. Reading and writing operations are discussed separately, first referring to the signals during normal operations and then referring to diagnostic operations.

A. READ command

Now referring to FIGS. 5, 6 and 7 and 14, a data transfer to the system begins by putting a READ command into the registers 133 and 140 in the controller and drive of FIGS. 6 and 7, respectively. A function decoder 299 (FIG. 14A) transmits an RDF signal in response to the FUNCTION bits. As the GO bit is set a subsequent RUN signal on the RUN wire 107 (FIG. 7) initiates the reading operation.

Figure 14A:
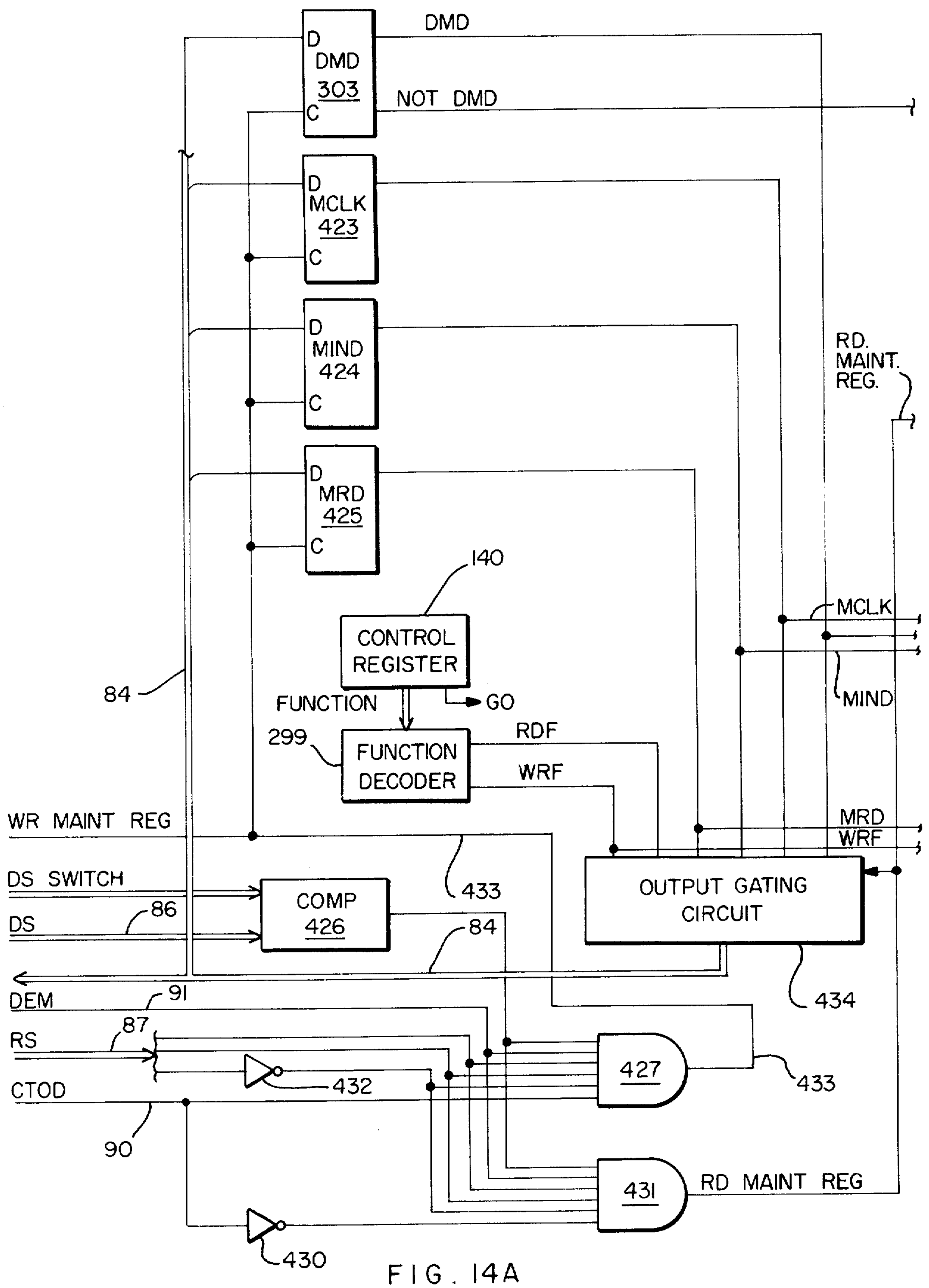
FIGS. 14A through 14D, is a detailed circuit schematic of one embodiment of control circuitry used in a drive for transferring data and diagnostic circuitry which responds to signals from and provides signals for the maintenance register in accordance with this invention.
Figure 14B:
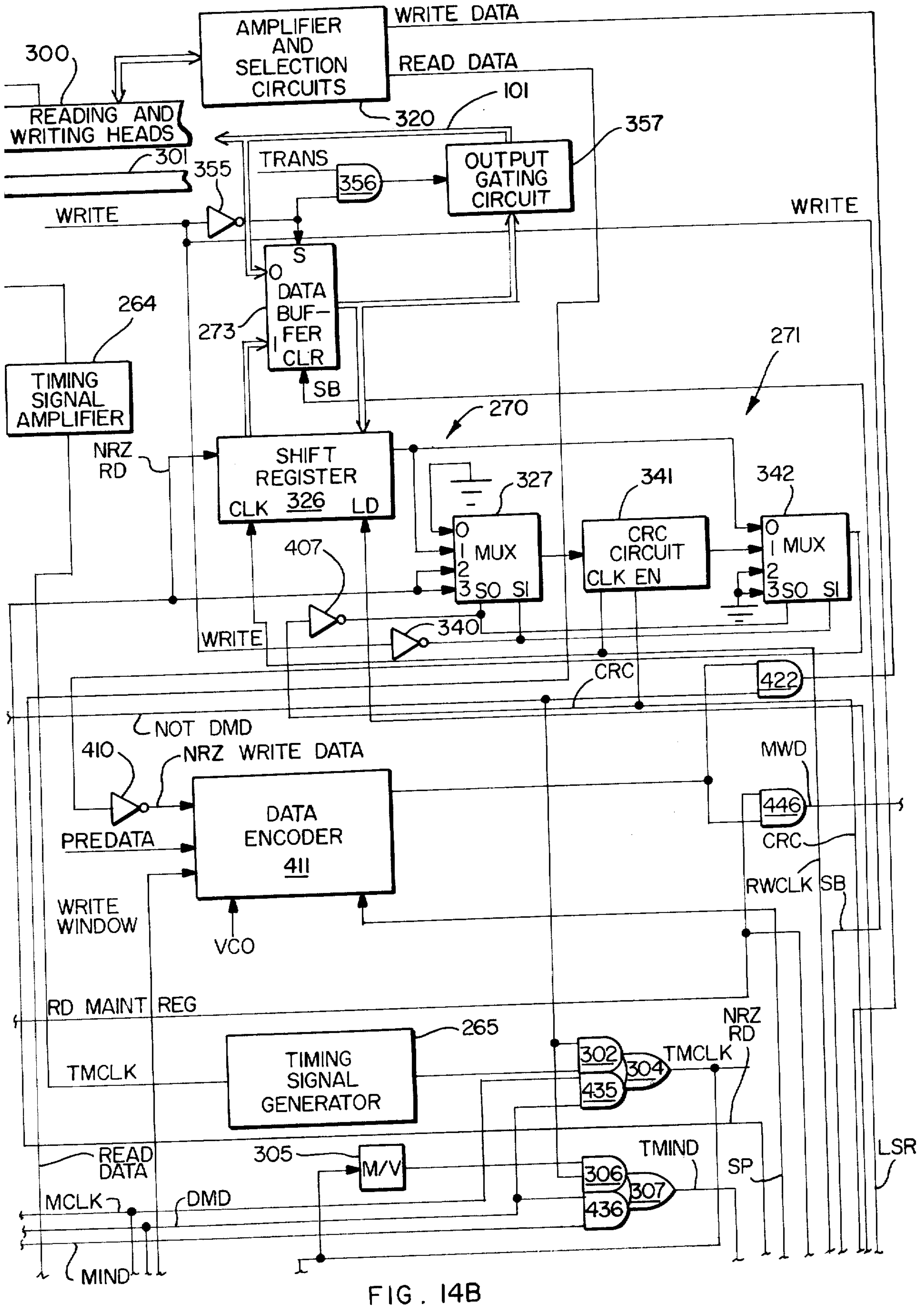

Referring to FIGS. 7 and 14B, a drive control circuit 262 (FIG. 7) and a drive transport and medium 263 control and perform the actual reading operation. The drive control circuit 262 responds to the desired address in the register 146 by either selecting or positioning the appropriate reading means. One of the reading and writing heads 300 (FIG. 14B) is fixed and disposed adjacent a revolving medium to constitute a timing head which, with a timing signal amplifier 264 and a timing signal generator 265, produces a digital clocking pulse as a timing signal each time a timing mark passes under the reading head. Each timing mark identifies the position of a data cell on the medium.

The resulting digital timing signals during normal operation pass from the timing signal generator 265 in FIG. 14B through an AND gate 302, enabled whenever a DMD flip-flop 303 (FIG. 14A) is reset; the timing signals then pass through an OR gate 304 (FIG. 14B) to produce internal timing pulses, designated TMCLK pulses. As described later, the DMD flip-flop 303 is set only during diagnostic operations.

The disk memory shown in FIG. 7 has a synchronous data path including the drive control circuit 262, shift register 270, data buffer 273 and other circuits. There are some means in a control path for identifying a reference position, known as an index position, on the disk. The specifically disclosed embodiment omits timing marks at one position on the timing track to identify this position. A retriggerable monostable multivibrator 305 (FIG. 14B) normally receives successive TMCLK pulses which force it to remain in its unstable state. It therefore produces no output pulses. However, when the gap in the timing track passes, the time between successive TMCLK pulses is sufficiently long to enable the multivibrator 305 to return to its stable state and thereby transmit a pulse. This pulse passes through an AND gate 306, enabled whenever the DMD flip-flop 303 is reset, and then through an OR gate 307 to appear as an index (TMIND) pulse.

Figure 14C:
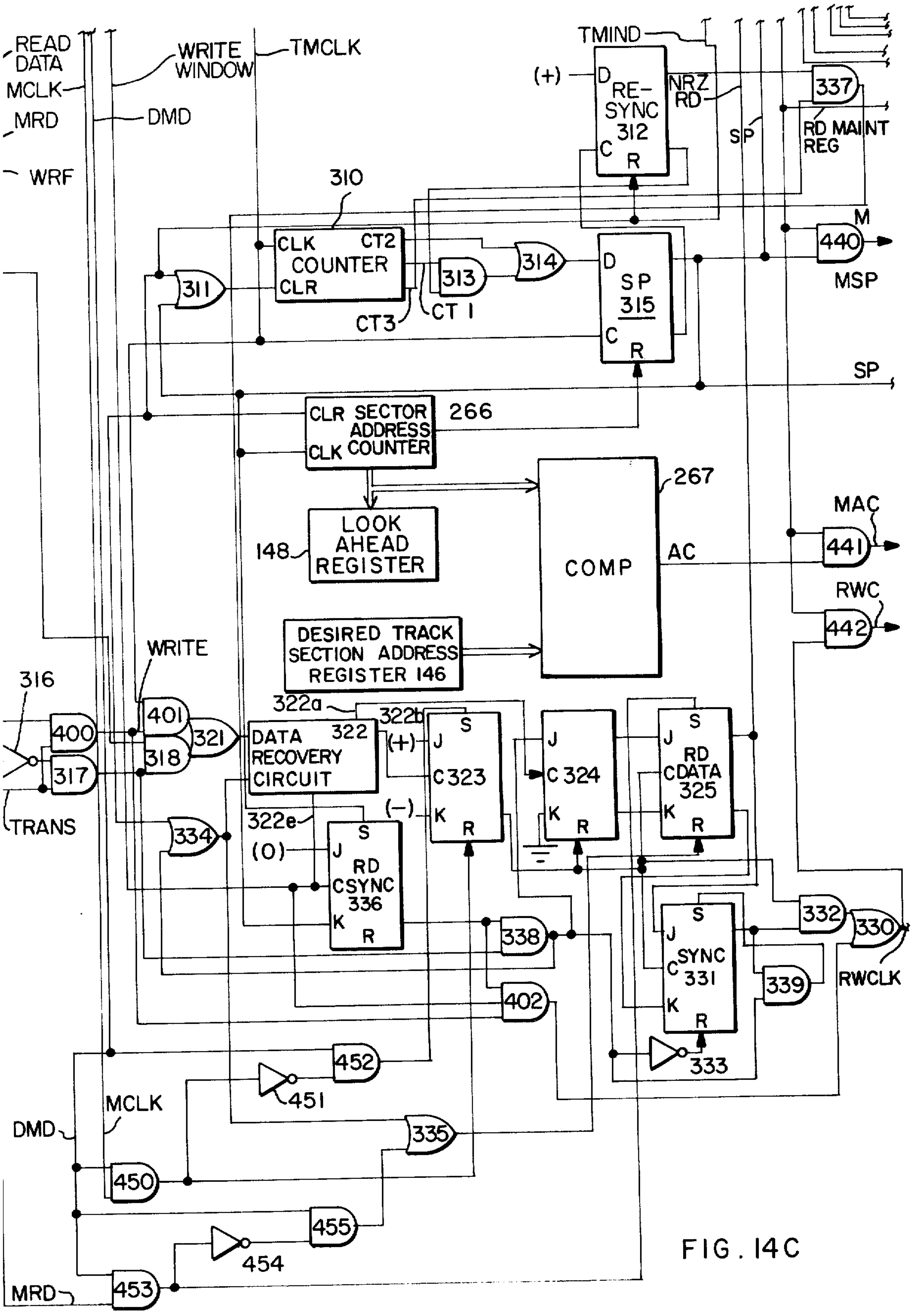

Now referring to FIG. 14C, which shows another portion of the drive control circuit, each TMIND pulse resets or clears the sector address counter 266, a counter 310 through an OR gate 311, and a RESYNC flip-flop 312. Subsequent TMCLK pulses advance the counter 310. Signals derived from a first set of cells after an index pulse synchronize disk operations. This first set contains fewer cells than are present in a sector. When the counter 310 reaches a number corresponding to the last data cell in the first set, it transmits a CR1 signal which energizes an AND gate 313 and an OR gate 314. A "next" TMCLK pulse then sets an SP flip-flop 315 to produce an SP pulse which clears the counter 310 through the OR gate 311 and terminates the CT1 signal. The "next next" TMCLK pulse resets the SP flip-flopp 315 and terminates the SP pulse. When the SP flip-flop 315 resets, it clocks the RESYNC flip-flop 312 to a set condition.

When the RESYNC flip-flop 312 is set, it disables the AND gate 313, so the counter 310 must then reach a second number (CT2) before energizing the OR gate 314. This number corresponds to the number of data cells in a sector. As previously indicated, the SP flip-flop 315 produces an SP pulse by setting in response to one TMCLK pulse and resetting on the succeeding TMCLK pulse. As each SP pulse advances the sector address counter 266 to identify a sector at the beginning of each sector, the counter 266 always contains the number of the sector currently under the reading and writing heads 300.

Still referring to FIG. 14C, the number in the sector address counter 266 is coupled to the look-ahead register 148 and the sector address comparison (COMP) circuit 267. When the numbers in the counter 266 and the register 146 are equal, the COMP circuit 267 transmits the AC signal indicating that the sector beginning to pass under the reading and writing heads 300 is to be involved in a transfer. At this time other circuitry (not shown) uses the AC signal to generate a TRANS signal when a transfer command is being processed and the RUN signal is active.

In FIG. 14C, an inverter 316 enables an AND gate 317 whenever the function decoder 299 (FIG. 14A) does not produce the WRF signal which indicates an operation other than a writing operation. The TRANS signal then energizes the AND gate 317 during a reading operation to indicate the beginning of an active reading transfer and enables an AND gate 318 to couple READ DATA signals from the amplifier and selection circuits 320 in FIG. 14B through an OR gate 321 in FIG. 14C into a data recovery circuit 322.

In accordance with a specific embodiment, using, for example, a Miller or MFM encoding, the data recovery circuit 322 in FIG. 14C transmits a pulse onto a conductor 322*a* each time the data recovery circuit 322 senses a flux reversal. A clocking signal on a conductor 322*b* alternately sets and resets a flip-flop 323 to define a reading window which is coextensive with the second and third quarters of each data cell. While the flip-flop 323 is reset, it maintains a flip-flop 324 in a reset condition. When the fllip-flop 323 is set, the reading window is defined, so the flip-flop 324 can be set by a signal on the conductor 322*a*. When the window closes, the flip-flop 323 resets and clocks a RD DATA flip-flop 325 so the RD DATA flip-fop 325 is set or reset in according with whether the recovered data is a ONE or ZERO. The resulting signals, designated NRZ RD signals, are coupled into a shift register circuit 326 shown in FIG. 14B which, with a multiplexer 327, forms the shift register 270.

The NRZ RD signals are loaded into the shift register circuit 325 by reading clock pulses, designated by RWCLK pulses, from an OR gate 330 in FIG. 14C. RWCLK pulses only appear during the actual transfer of data. During a reading operation, the RWCLK pulses depend upon the reading window signals from the flip-flop 323 and the output of a SYNC flip-flop 331.

The SYNC flip-flop 331 only enables the reading window signals to pass through an AND gate 332 during an actual reading operation involving data. There are two conditions under which (i) an inverter 333 or (ii) the RD DATA flip-flop 325 keeps the SYNC flip-flop 331 reset to disable the AND gate 332.

The inverter 333 keepps the SYNC flip-flop 331 reset while a first area following the index position passes the heads 300 (FIG. 14B). The TMIND pulse passes through OR gates 334 (FIG. 14C) and 335 to reset the RD DATA flip-flop 325. During the following interval, a synchronizing operation occurs and a RD SYNC flip-flop 336 is kept reset by the RESYNC flip-flop 312 and an AND gate 337. Each TMIND pulse resets the flip-flop 312 and disables the AND gate 337 until the trailing edge of the first SP pulse again sets the RESYNC flip-flop 312. The AND gate 337 then remains disabled until the counter 310 passes a synchronizing area at the beginning of each sector. The end of this area is defined by a CT3 pulse from the counter 310. Thus, after a TMIND pulse, through the synchronizing area of the first sector and thereafter through the synchronizing areas in successive sectors, the AND gate 337 is disabled. When the AND gate 337 subsequently is energized it conditions the RD SYNC flip-flop 336 to be reset by a clocking signal. As the AND gate 337 is not energized, the RD SYNC flip-flop 336 is not reset during the synchronizing areas, so an AND gate 338 is disabled, and the inverter 333 generates an overriding resetting signal.

A second set of synchronizing areas also pass the reading head at the beginning of each sector. These constitute a series of data ZERO's followed by a ONE in a synchronizing bit position. Once the first synchronizing area in a sector has passed the heads 300, the SYNC flip-flop 331 is conditioned to respond to the synchronizing bit. When that bit appears, it sets the RD DATA flip-flop 325 and conditions the SYNC flip-flop 331, but does not cause the flip-flop 331 to set until the next data cell is being read. Thus, the SYNC flip-flop 331 does not enable the AND gate 332 until the first data cell is read. Thereafter, the SYNC flip-flop 331 remains set by virtue of a feedback loop including an AND gate 339 until the AND gate 338 is disabled either at the beginning of the next sector or in response to an index (TMIND) pulse. Hence, the RWCLK pulses are clocking pulses which are on a one-for-one basis with the data bits during a reading operation.

Referring now to FIG. 14B, successive RWCLK pulses shift the NRZ RD signals into the shift register circuit 326 until it contains an entire word. The multiplexer 327 is simultaneously conditioned by an inverter 340 during a reading operation to receive the NRZ RD signals, and to load, with successive RWCLK pulses, the data into a CRC (cyclical redundancy check) testing circuit 271 comprising a CRC circuit 341 and a multiplexer 342. During a reading operation, the inverter 340 conditions the multiplexer 342 so no data is transmitted therefrom. The use of CRC circuits is known in the art.

When the shift register 326 contains an entire word, it is loaded in parallel into the data buffer 273 in response to a strobe buffer (SB) pulse. During a reading operation, the SB pulse is transmitted in response to signals from a divider circuit 344 shown in FIG. 14D. This divider circuit is cleared by SP pulses. Successive RWCLK pulses during a reading operation are properly phased for a reading operation by an AND gate 345, enabled by an inverter 346, and pass through an OR circuit 347 as an input to the divider circuit 344. When the last bit in each half of a data word is being loaded into the shift register 326 (FIG. 14B), the divider circuit 344, which includes a counter, clocks a flip-flop 348. The flip-flop 348 is set when the last bit in the first half of a data word is received and when the last bit in the second half of the data word is received.

While the last bit in the second half of the data word (i.e., the last bit in the full data word) reaches the register 326, an AND gate 350 transmits an LB signal. Thus, the LB signal indicates that the shift register 326 contains the last bit of data in a word.

An AND gate 351 is enabled by the LB signal, an inverter 352 during a reading operation, and a normally set flip-flop 353. It couples the RWCLK pulse to an OR gate 354 as the SB pulse. The flip-flop 353 is reset by a SP pulse to disable the SB pulse while the first word is being loaded into the shift register 326. Otherwise, ZERO's would be loaded into the data buffer 273 in FIG. 14B as the first data word. It is set when the flip-flop 348 resets. Thus, the SB pulses load the successive data words into the data buffer 273 in FIG. 14B from the shift register 326 in paraallel during a reading operation. The data buffer 273 also includes multiplexing circuits to select, as an input, the output from the shift register in response to the signal from an inverter 355. The TRANS signal, which indicates a data transfer is actively underway, and the signal from the inverter 355 energize an AND gate 356 which enables an output gating circuit 357 to couple the data from the data buffer 273 onto the synchronous data lines 101.

Figure 14D:
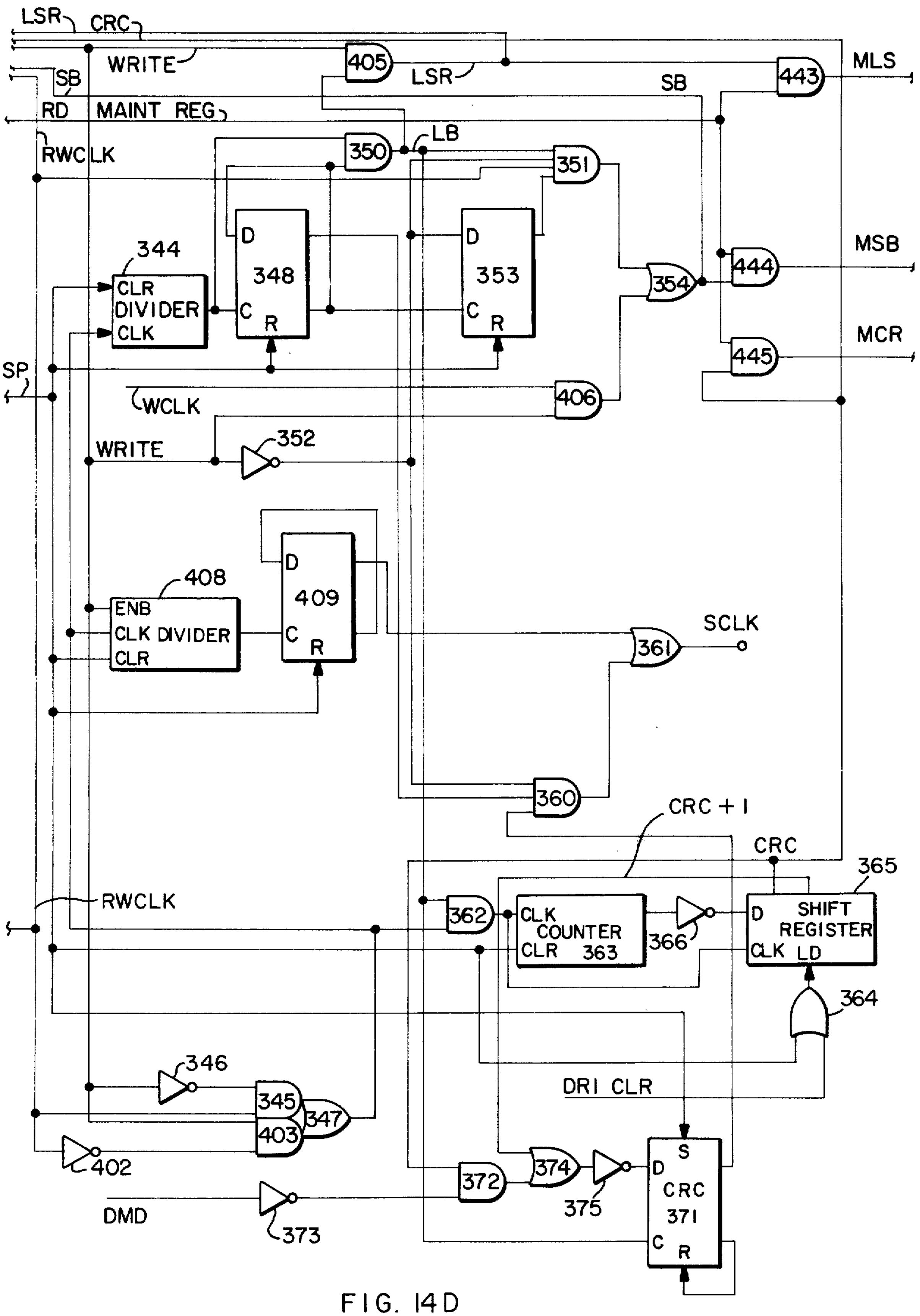

Now referring to FIG. 14D, when the flip-flop 348 sets during a reading operation, it and the AND gate 350 enable an AND gate 360 to transmit, through an OR gate 361, an SCLK pulse corresponding to each data word. SCLK pulses, as previously described, cause the controller to store data words on the synchronous data lines. SCLK pulses are asserted midway between the SB signals to sample the data at an optimum time and are transmitted only when the data buffer 273 in FIG. 14B has data.

During a reading operation, the SCLK pulse must be disabled during each portion of a sector while the cyclical redundancy check word is being processed. As shown in FIG. 14D, reading clock pulses from the OR gate 347 pass through the AND gate 362 when it is enabled. Specifically, the AND gate 362 is enabled by the LB signal from the AND gate 350, so one reading clock pulse advances a counter 363 each time a word has been transferred into the shift register 326 in FIG. 14B. Still referring to FIG. 14D, each SP pulse clears the counter 363 and, through an OR gate 364, a shift register 365. The output from the counter 363 is a ZERO until a sector has been transferred; and the counter 363 can be considered as having a modulus based on the number of words in a sector. Thus, the shift register 365 receives ZERO's during successive clocking pulses from the AND gate 362 while data words are being transferred. When all the date words in a sector are transmitted, the counter 363 produces a ONE at the input to the shift register 365 to indicate that the next word is a cyclical redundancy check word. The next pulse from the AND gate 362 shifts a ONE into the first stage of the shift register 365 and produces a CRC signal. When the CRC signal is asserted during a reading operation, the output of the multiplexers 327 and 341 in FIG. 14B are not affected, but the CRC circuit 341 is enabled to operate. The next pulse from the AND gate 362 shifts the ONE to another stage and the shift register 365 transmits a CRC+1 signal. While the CRC and the CRC+1 signals are active, the AND gate 360 is disabled by a CRC flip-flop 371 and blocks SCLK pulses. Specifically, the CRC signal energizes an AND gate 372, enabled during normal operations by an inverted 373. Thus, an OR gate 374 and an inverter 375 condition the CRC flip-flop 371 to be reset when the LB signal becomes active as a CRC word is transmitted. The CRC+1 signal is coupled to the OR gate 374 to keep the flip-flop 371 reset and the AND gate 360 disabled. So long as the flip-flop 371 is set, the AND gate 360 is enabled to pass successive clocking pulses through the OR gate 361 and onto the SCLK wire 105 shown in FIG. 7.

Successive SCLK pulses transfer data to the controller as previously indicated. This operation continues until the RUN signal is terminated whereupon the circuitry shown in FIG. 14 terminates its operations. Thus, in response to a READ command, the controller and driver transfer the desired number of words from a sector or sectors on the medium in serial fashion through the shift register 326 and into the data buffer 273 and then onto the synchronous data path 101. Then the system retrieves the data over the system bus 120 as shown in FIG. 5. The storage facility 123 in FIG. 5 accommodates the diverse transfer rates. Its size and operation insure that there is sufficient data available for efficient transfers to the system. If the system does not retrieve data words in a timely fashion, other circuits in the controller 126 sense the arrival of data at the receivers 280 and prior data in the input buffer 122 and set the DLT bit in the control and status register 134.

B. WRITE command

During a writing operation, data moves from the system over the data section 100 of a device bus to be stored in the data bus. A WRITE command from the system initiates the transfer after the word counter register 136, bus address register 137, drive word counter register 174, and other of the status and control registers are located, as previously indicated. Drive and controller response to a WRITE command can be seen by reference to FIGS. 5, 7 and 14.

Initially, the interruption control 293 in the controller (FIG. 5) produces a series of INTERRUPT signals to transfer data words from the system bus 120 through receivers/drivers 295 and an input multiplexer 281 into the input buffer 122. As the input buffer 122 receives successive data words, the storage control 292 transfers them into the storage facility 123 until the storage facility 123 fills or until the word counter register 136 indicates that all the required data words have been transferred to the controller. In either case, the data words shift through the storage facility 123, and the output buffer 125 eventually receives a data word.

When the output buffer 124 first receives a data word, the controller may begin a transfer to the drive. A WRITE signal, produced in response to the function bits, enables drivers 297 to load data onto the data set 101 which includes data wires 102 and data parity wire 103 (FIG. 4). Then a sequence between the controller and drive transfers the bits in the data word from the controller in parallel and onto the medium in series.

Referring to FIG. 14A, when the control register 140 receives a WRITE command, the function decoder 299 produces a WRF signal which enables an AND gate 400 in FIG. 14C. When the comparator 267 indicates that the proper sector is positioned under the reading and writing heads 300, the TRANS signal becomes active and an AND gate 401 couples the TMCLK pulses from the OR gate 304 (FIG. 14B) through the OR gate 321 into the data recovery circuit 322. The data recovery circuit 322 transmits a WRITE WINDOW pulse on a conductor 322*e* which is active during the last and first quarters of successive data cells for writing purposes. When actual data storage areas are passing under the heads 300 (FIG. 14B), the RD SYNC flip-flop 336 is reset, so successive WRITE WINDOW pulses pass through an AND gate 402 and the OR gate 330 as the RWCLK pulses. These pulses are disabled while the various synchronizing areas on the disk pass by the heads 300 as previously indicated.

Referring to FIG. 14D, the RWCLK pulses pass through an inverter 402 and an AND gate 403, enabled by the WRITE signal, to produce properly phased writing clock pulses, which are the complement of the RWCLK pulses. These write clocking pulses also advance the counter 344 to transmit LB signals. During a writing operation, however, an AND gate 405 (FIG. 14D) is enabled by the WRITE signal to pass each LB signal as an LSR pulsee. Each LSR pulse conditions the shift register 326 (FIG. 14B) to receive data from the data buffer 273 on a next RWCLK pulse as the last bit from a previous data word is transferred to the multiplexers 327 and 342. During a writing operation, the multiplexer section on the data buffer 273 is conditioned by the inverter 355 to receive data words from the data section 101 under the control of SB pulses from the OR gate 354 in FIG. 14D. During a writing operation, however, an AND gate 406 passes WCLK pulses (from the WCLK wire 106 in FIG. 7) as the SB pulses. In addition, the signal from the inverter 352, during a writing operation, disables the AND gates 351 and 360.

The WRITE signal also enables a circuit including a counter 408 in FIG. 14D and a flip-flop 409 which operate analogously to the counter 344 and flip-flop 348. During a writing operation, the flip-flop 409 provides the input to the OR gate 361 to transmit the SCLK pulses.

Referring to FIG. 14B, the CRC signals are not asserted initially, so the inverter 340 and another inverter 407 condition the multiplexer 327 to couple the output from the shift register 326 into the CRC circuit 341. The multiplexer 342 is also conditioned to pass, simultaneously, the series of data signals from the shift register 326 through an inverter 410 as NRZ WRITE DATA pulses which are fed to a Miller or MFM encoder 411. A PREDATA signal, which is a timing signal, enables the data encoder 411 to receive the NRZ WRITE DATA signals and transmit, in response to the WRITE WINDOW signal and a synchronizing VCO signal from a VCO oscillator in the data recovery circuit 322 and SP pulses from the flip-flop 315 (FIG. 14C), properly encoded signals to an AND gate 422 enabled whenever the DMD flip-flop 303 in FIG. 14A is reset. The AND gate 422 in FIG. 14B gates the output from the data encoder 411 to the amplifier and selection circuits 320 as WRITE DATA signals.

Additional transfers continue in this sequence during normal operations until the drive receives the last word in a sector or block. At the end of each sector the CRC signal from the shift register 365 in FIG. 14D enables the multiplexer 342 to transfer the CRC word in the CRC circuit 341 onto the medium. The circuit in FIG. 14D operates as previously described with respect to a reading operation. Thus, the CRC circuitry can detect errors which might be introduced during transfers in the drive itself. Then the drive transmits an EBL signal onto the wire 110. The controller receives the EBL signal, terminates it and monitors the RUN signal, If the RUN signal has terminated, the synchronous data section is disabled, the GO bit in the drive control register is reset and the DRY bit in the status register 141 is set. This terminates the TRANS signal and operations in both the drive and controller in connection with the transfer.

C. Diagnostic Operations

As shown in FIG. 13, the maintenance register comprises a plurality of stages including, for example, the DMD flip-flop 303 in FIG. 14A. Its state can be changed by a remote register writing operation. Other stages which remote writing operations can alter include an MCLK flip-flop 423, and MIND flip-flop 424 and the MRD flip-flop 425. Whenever a malfunction occurs, the operation of particular drive and controller can be monitored at a very slow operational rate by using a series of remote register writing and reading operations to simulate all drive operations.

The control circuit which responds to remote register reading and writing operations also is shown in FIG. 14A. It includes a comparator (COMP) 426 which receives the DS signals on conductors 86 and produces an output signal which serves one enabling input to AND gate 427 and 430 whenever the DS signals are equal to DS switch signals. DS SWITCH signals are internal signals which identify the drive uniquely with respect to other drives connected to the same controller. During a remote register writing operation, the CTOD signal on conductor 90 is active and enables the AND gate 427 while an inverter 430 disables an AND gate 431. RS signals on conductors 87 are modified to produce enabling inputs to the AND gate 427 and to AND gate 431 whenever the maintenance register is designated. In this specific example, an inverter 432 receives the most significant register selection signal and couples it to the AND gate 427 and 431 while the two least significant bit positions are applied as direct inputs. Thus, the maintenance register is designated as register "$03_8$". As previously indicated, the DEM signal on wire 91 indicates the presence of data during a writing operation and it is also coupled to the AND gates 427 and 431. During a writing operation, only the AND gate 427 can be energized by the CTOD signal to produce a WR MAINT REG signal on a wire 433. This signal clocks each of the flip-flops 303, 423, 424 and 425 and sets or resets those flip-flops depending on the state of the signal coupled to each data (D) input over a corresponding one of the control data wires During a remote reading operation the CTOD signal is inactive and disables the AND gate 427, but the inverter 430 enables the AND gate 431 to transmit and RD MAINT REG signal during the DEM signal. The RD MAINT REG signal enables an output gating circuit 434 to couple the output signals from each of the flip-flops 303, 423, 424 and 425 as well as the RDF and WRF signals from the function decoder 299 onto corresponding ones of the control data wires 85 to thereby transmit back to the controller the DMD, MCLK, MIND, MRD, RDF and WRF signals.

Whenever the DMD flip-flop 303 is set, the drive is in a diagnostic mode. This flop-flop 303 effectively isolates the reading and writing heads 300, the amplifier and selection circuits 320 and the timing signal generator 265 in FIG. 14B from the remainder of the circuitry, which can be considered as a data path. Specifically, setting the flip-flop 303 in FIG. 14A disables the AND gate 302 in FIG. 14B with an inactive NOT DMD signal to prevent signals from the timing signal generator 265 from passing through the OR gate 304 as the TMCLK signals. The AND gate 422 also is disabled so the data, which would otherwise be transferred into the amplifier and selection circuits 320, is blocked.

The MCLK flip-flop 403 can then be alternately set and reset by successive maintenance register writing operations to simulate the timing pulses normally derived from the disk 301. Specifically, an AND gate 435, enabled by the DMD signal, assumes the state of the flip-flop 423, so the OR gate 304 transmits the simulated TMCLK pulses as the internal timing pulses. The output of another AND gate 436, also enabled by the DMD signal, reflects the state of the MIND flip-flop 424 and transmits through the OR gate 307, a simulated TMIND pulse.

Thus, the AND gates 302 and 435 and the OR gate 304 constitute a selective coupling circuit for routing either the output from the amplifier 264 or the MCLK flip-flop 425 to the data path control circuit as the internal timing signals. The AND gate 306 is also disabled so the output of the multivibrator 311 can not produce TMIND pulses. The AND gates 306 and 436 and the OR gate 307 constitute a selective coupling means for transmitting index pulses.

Therefore, all the necessary timing and index pulse signals exist, but they change at a controlled and substantially slower rate than normal. Furthermore, by effectively decoupling the drive and analog circuitry from the remainder of the circuitry by means of another coupling circuit comprising the AND gate 422 and circuits connected to the flip-flops 323 and 325 shown in FIG. 14B, the diagnosis can proceed under otherwise substantially normal operating conditions.

As previously indicated, the foregoing stages of the maintenance register 144 can be altered and monitored by a remote register reading operation. Specifically, the assertion of the RD MAINT REG signal couples the signals representing the states of the flip-flops 303, 423, 424 and 425 as well as the RDF and and WRF signals onto predetermined ones of the CD wires 84. Other signals are also monitored. An AND gate 440 shown in FIG. 14C couples a signal representing the state of the SP flip-flop 310 onto a corresponding CD wire 84 as an MSP signal. AND gates 441 AND 442 are enabled to couple, respectively, the AC signal from the comparator 267 and the RWCLK signal from the OR gate 330 onto corresponding conductors as MAC and RWC signals. In FIG. 14D, AND gates 443, 444 and 445 transmit MLS, MSB and MCR signals indicating the state of the LSR, SB and CRC signals, respectively. An AND gate 446 in FIG. 14B provides the MWD signal representing a data signal which would, in normal operation, be written onto the disk 301.

In the diagnostic mode, the flip-flops 323 and 325 in FIG. 14C are effectively decoupled from the data recovery circuit 322 and are controlled in response to the states of the MCLK flip-flop 423 and the MRD flip-flop 425 shown in FIG. 14A. Still referring to FIG. 14C, MCLK pulses, transmitted when the MCLK flip-flop 423 in FIG. 14A is set, energize the AND gate 450 in FIG. 14C to apply an overriding resetting signal to the flip-flop 323. When the MCLK signal is not asserted, because the MCLK flip-flop 423 in FIG. 14A is reset, an inverter 451 in FIG. 14C couples the output from the AND gate 450 to another AND gate 452. The AND gate 452, enabled by the DMD signal, applies an overriding setting signal to the flip-flop 323. Thus, the flip-flop 323 in FIG. 14C tracks the MCLK flip-flop 423 in FIG. 14A during diagnostic operations to provide a clocking input to the SYNC flip-flop 331.

Likewise, the RD DATA flip-flop 325 in FIG. 14C is controlled by overriding setting and resetting signals under the control of the MRD flip-flop 425 in FIG. 14A. When the MRD flip-flop 425 is set, an AND gate 453 in FIG. 14C, enabled by the DMD signal, directly sets the RD DATA, flip-flop 325. When the MRD flip-flop 425 is reset, the AND gate 453 is not energized, but an inverter 454 energizes an AND gate 455, also enabled by the DMD signal, to directly reset the RD DATA flip-flop 325.

With this understanding of the circuitry shown in FIG. 14, it is possible to understand how a typical diagnostic program might operate in order to analyze the operation of a secondary storage facility which uses this invention. First, the program would perform a remote register writing operation to set the DMD flip-flop 303 in FIG. 14A. All subsequent instructions which would produce a remote register writing operation involving the maintenance register would also set the DMD flip-flop 303 to keep the system in a diagnostic mode. Referring now to FIGS. 6 and 7, as a next step the diagnostic program could retrieve the contents of a register in a drive, such as the drive type register 147, which has a known contents. A successful retrieval would indicate proper operation, during a remote register reading operation, of much of the control circuit 150, address circuit 151, register selection decoder 152, address timing circuit 155, timing circuit 156, device bus control 160, output drivers 161, receivers 171, multiplexer 170 and drivers 166 shown in the controller in FIG. 6. Further, the operation of the drive selection decoder 175, register selection decoder 180, control section timing unit 181, and the device bus 121 also would be checked. Additional local and remote reading and writing operations with other registers verify the proper operation of all the remaining circuits in asynchronous control path, except for those that respond to commands in the control and status register 133 and control register 140. All these operations are performed under actual operating conditions. It is also possible to transfer to the registers 133 and 140 operating commands other than transfer commands to monitor drive response.

After this series of steps, successive reading and writing operations of maintenance register 144 would simulate a synchronous data transfer at a greatly reduced rate to thereby check the operation of the synchronous data path. As the operation is controlled by an instruction sequence, critical events can be readily monitored by retrieving the contents of the maintenance register 144 and other registers and comparing then with the expected contents.

The effectiveness of this invention can be even more fully appreciated by explaining, in general terms, some parts of a typical diagnostic program. To initially test the synchronous data path, two remote register writing operations would transmit a simulated index pulse. The contents of various registers, such as registers 144 and 148 in FIG. 7, could then be retrieved to ascertain the effect of the index pulse. Then a sequence of instructions could transmit a number of MCLK pulses equal to the number of data cells in a sector. After the proper number of MCLK pulses had been transmitted, the registers 144 and 148 would be read to verify the operation of sector address counter 266 in FIG. 14C. During successive sectors, additional checks would also be made until one complete revolution of the medium 301 in FIG. 264 had been simulated. If an appropriate number of index pulses are produced without a transfer, then the OPI bit position in the error register 142 should be set. This would test all the related error circuits.

A reading operation can also be simulated. The BAI bit position in the register 134 (FIG. 13) might be set so all transfers are made to one location to facilitate comparisons. Then a series of remote registers writing operations alternately set and reset the MCLK flip-flop 423 in FIG. 14A and every other operation conditions the MRD flip-flop 425. This simulates a serial data stream, and the remaining circuits in the data path of the drive and controller convert the data into a parallel format and transfer it to the system. Comparisons of the successive data word received at the location identified by the bus address register 137 (FIG. 6) and the data words transferred to the drive then indicate whether any erros have occurred.

Similar steps can be used to simulate a writing operation from a series of system storage locations. The serial data stream would be checked by monitoring the MWD signal from the AND gate 446 (FIG. 14B) in the maintenance register 144 at appropriate intervals.

Discrepencies are easily determined and appropriate error messages printed during such an operation. These messages enable a technician to immediately analyze the facility and pinpoint the source of the malfunction. Only if a diagnostic program were completed without identifying any problems would the technician have to begin analyzing the analog and closely related digital circuitry which is otherwise isolated during diagnostic operations. Thus, in accordance with this invention, the diagnostic circuitry provides a means for analyzing failures or malfunctions from a central processor unit while exercising the system under substantially normal operating conditions.

The specifically disclosed signals are related to a disk memory. For other types of memories, different signals might be utilized. Generally, a facility incorporating this invention will include circuits for setting a drive into a diagnostic mode, such as those associated with the flip-flop 303, circuits for generating timing pulses, such as those associated with the CLK flip-flop 424, and circuits for transmitting data, such as those associated with the MRD flip-flop 425. Other alterable bit positions might be included.

Similarly, there are disclosed bit positions in the maintenance register which correspond to signals at specific points within a disk drive. Such signals as SP pulse are closely related to such drives. Other signals might be more appropriately monitored in other drive units.

For example, a typical tape drive adapted for using this invention would include a maintenance register with a DMD flip-flop. Rather than have a separate stage for simulating the internal timing signals, a tape drive might have a series of stages for receiving a number of different function codes to control diagnostic operations. If certain of these require internal timing signals, a decoder and flip-flop could be connected to respond to such function codes by alternately setting and resetting the flip-flop to simulate the timing pulse. In that case, a reading operation would retrieve the function code, but not the state of the timing signal. Further, the maintenance register might also receive the data bits normally transferred to the tape.

Still other drives and even other peripherals or elements in such a system will use the basic structure and operation described in detail with respect to a disk drive or an equivalent structure and operation. In accordance with the basic operation, however, the recording medium and the related analog circuits effectively are isolated from the rest of the system. Timing, data and other control signals are simulated. All or many of the enumerated advantages will be attained if this invention is applied to other drives and elements. Therefore, it is the object of the appended claims to cover all such variations and modifications as come within the true spirit and scope of this invention.

What is claimed as new and desired to be secured by Letters Patent of the United States is:

1. A unit for connection to a bus in a data processing system, said unit comprising:

A. a storage element including
   i. data means for receiving and transmitting data, and
   ii. means for transmitting timing signals,
B. a register means including a first bistable stage for transmitting a mode signal defining a normal operating mode for said unit in a first state and a diagnostic operating mode in a second state,
C. a second bistable stage for transmitting a simulated clocking signal,
D. means responsive to signals from the bus for altering the states of each of said first and second bistable stages,
E. a data path for connecting said storage element to the bus, said data path including
   i. first selective coupling means responsive to the first and second states of the mode signal from said first bistable stage for coupling signals from, respectively, said timing signal transmitting means and said second bistable stage therethrough as internal timing signals,
   ii. second coupling means responsive to the first state of the mode signal for coupling data between said data means and said data path and, in response to the second state of the mode signal, decoupling said data path from said data means, and
   iii. data path control means responsive to the internal timing signals for controlling the transfer of data through said data path.

2. A unit as recited in claim 1 additionally comprising means responsive to signals from the bus for retrieving the states of stages in said register means for transfer over the bus.

3. A unit as recited in claim 2 additionally comprising:
   i. a third bistable stage in said register means responsive to said register altering means,
   ii. reading control means in said data path control means said second coupling means connecting said data means and said reading control means, and
   iii. means responsive to the second state of the mode signal for causing said reading control means to respond to signals from said second and third stages in said register means.

4. A unit as recited in claim 2 additionally comprising:
   i. writing control means in said data path, said second coupling means connecting said writing control means and said data means, and
   ii. means responsive to said register retrieval means for retrieving data from said second coupling means when the mode signal is in its second state.

5. A unit as recited in claim 2 additionally comprising:
   i. means in said storage element for transmitting periodic position pulses, ii. another bistable stage in said register means responsive to said register altering means for transmitting a simulated position pulse, iii. utilization means in said data path control means for responding to internal position pulses, iv. third coupling means responsive to the first state of the mode signal from said first bistable stage for coupling the periodic position pulses from said storage element to said utilization means as internal position pulses and responsive to the second state of the mode signal for coupling the simulated position pulses to said utilization means.

6. A unit as recited in claim 2 additionally comprising:

i. means in said data path control means for transmitting other control signals in response to the internal timing signals, and ii. means in said data path control means responsive to said register retrieval means for transferring to the bus the other control signals.

7. A unit as recited in claim 2 adapted for receiving commands for controlling the operation of said unit, said unit comprising:

i. means in said data path control means for transmitting command signals in response to a command, and ii. means in said data control path control means responsive to said register retrieval means for transferring to the bus the command signals.

8. A direct access memory unit comprising

A. a rotatable storage element

B. data means including i. reading and writing means for retrieving from and transferring to said storage element signals representing data, and ii. means for converting signals between digital data signals and signals representing data in said storage element, C. timing means including i. means for recovering from said storage element timing signals, and ii. means for converting the timing signals into digital timing signals, D. means for transmitting an index pulse to identify one position on said storage element, E. a maintenance register comprising a mode stage, a clock stage, an index stage, and a data stage, F. means for altering each of said stages independently, G. data path means including control means responsive to internal timing pulses and internal index pulses for effecting transfers to and from said data means, H. first coupling means connected, in response to a first state of the mode signal, to said timing signal conversion means and said index pulse means for transmitting the internal timing and index pulses and, in response to the second state of the mode signal, to said clock and index stages for transmitting the internal timing and index pulses, and I. second coupling means responsive to the first state of the mode signal for coupling signals between said data path means and said data means and responsive to the second state of the mode signal for decoupling said data means and said data transfer means.

9. A direct access memory unit as recited in claim 8 additionally comprising means for retrieving the contents of said maintenance register.

10. A direct access memory unit as recited in claim 9 additionally comprising:

i. reading control means in said data path control means operable when the mode signal is in the first state for enabling said reading control means to respond to digital data signals from said data means, and ii. means responsive to the second state of the mode signal for causing said reading control means to respond to said data stage in said register.

11. A direct access memory unit as recited in claim 9 additionally comprising:

i. writing control means in said data path control means operable when the mode signal is in the first state for enabling said writing control means to transfer digital data signals to said data means, transfers to said data means being disabled when the mode signal is in its second state, and ii. means in said maintenance register retrieval means for retrieving from said writing control means the data signal when the mode signal is in its second state.

12. A direct access memory unit as recited in claim 9 additionally comprising:

i. a sector counter in said data path control means responsive to the internal timing signals for defining a sector of said storage element upon which the data means can operate, ii. means in said data path control means responsive to said sector counter for transmitting, as an output signal, a sector pulse identifying a predetermined position in each sector, and iii. means in said register retrieving means for retrieving the output signal from said sector pulse transmitting means.

13. A direct access memory unit as recited in claim 12 additionally comprising:

i. an address register in said data path control means for storing a sector number identifying a sector in said storage element, ii. comparison means in said data path control means connected to said sector counter and said address register for transmitting, as an output signal, a confirmation signal when the contents of said sector counter and said address register are equal, and iii. means in said register retrieval means for retrieving the output signal from said comparison means.

14. A direct access memory unit as recited in claim 9 additionally comprising:

i. data buffer means in said data path for transferring data words to and receiving data words from the bus, said data buffer means being operable in response to strobing signals, ii. means in said data path control means responsive to the internal control signals for transmitting, as an output signal, the strobing signal for said data buffer means, and iii. means in said register retrieval means for retrieving the output signal from said strobing signal transmitting means.

15. A direct access memory unit as recited in claim 14 wherein said data buffer means comprises a shift register responsive to shift pulses and to loading pulses, said memory unit additionally comprising:

i. means in said data path control means for transmitting, as an output signal, the shift pulses in response to the internal timing signals, ii. means in said data path control means responsive to the internal timing signals during a transfer of data to said storage element for transmitting, as an output signal, the loading pulses, and iii. means in said register retrieval means for retrieving the output signal from said loading pulse transmitting means.

16. A direct access memory unit as recited in claim 9 additionally comprising:

i. means in said data path for performing data checking operations during a transfer, ii. means in said data path control means for transmitting as an output signal, an enabling signal from said data checking means, and iii. means in said register retrieval means for retrieving the output signal from said enabling signal transmitting means.

17. A direct access memory unit as recited in claim 9 additionally comprising:

i. a control register in said data path control means for receiving commands, each command including a function code, ii. decoding means in said data path control means connected to said control register to decode the function codes for transmitting a reading output signal and a writing output signal, iii. means in said register retrieval means for retrieving the reading and writing output signals from said function code decoding means.

18. A direct access memory unit as recited in claim 9 additionally comprising:

i. means in said data path control means for transmitting, as an output signal, reading clock pulses or writing clock pulses in response to the internal timing pulses, and ii. means in said register retrieval means for retrieving the output signal from said reading or writing clock pulse transmitting means.

* * * * *

UNITED STATES PATENT OFFICE

CERTIFICATE OF CORRECTION

Patent No. 3,911,402 Dated October 7, 1975

Inventor(s) Peter McLean et al

It is certified that error appears in the above-identified patent and that said Letters Patent are hereby corrected as shown below:

Column 1, line 55, delete "betwen" and insert --between--
Column 6, line 7, delete "deivce" and insert --device--
Column 11, line 15, delete "decorder" and insert --decoder--
line 26, delete "73" and insert --173--
line 35, delete "inpu-output" and insert --input-output--
Column 12, line 12, after "signal" insert --onto the bus when the drive has moved control information--
Column 18, line 9, delete "40" and insert --140--
Column 19, line 6, after "marks" insert a closed parenthesis --)--
line 21, after "desired" insert --track--
line 59, delete "are" and insert --as--
Column 20, line 48, delete "simulalte" and insert --simulate--
Column 22, line 19, delete "is" and insert --in--
line 22, delete "caause" and insert --cause--
line 56, delete "thee" and insert --the--
Column 24, line 43, delete "CR1" and insert --CT1--
line 49, delete "flopp" and insert --flop--
Column 25, line 27, delete "fllip-flop" and insert --flip-flop--
line 31, delete "flip-fop" and insert --flip-flop--
line 51, delete "keepps" and insert --keeps--
Column 27, line 2, delete "paraallel" and insert --parallel--
line 38, delete "date" and insert --data--
line 54, delete "verted" and insert --vertor--
Column 29, line 4, delete "pulsee" and insert --pulse--
Column 30, line 35, after "wires" insert --84.--
Column 31, line 32, delete "AND" (second occurrence) and insert --and--

UNITED STATES PATENT OFFICE

CERTIFICATE OF CORRECTION

Patent No. 3,911,402 Dated October 7, 1975

Inventor(s) Peter McLean et al

It is certified that error appears in the above-identified patent and that said Letters Patent are hereby corrected as shown below:

Column 32, line 42, delete "then" and insert --them--
line 59, delete "FIG. 264" and insert --FIG. 14B--
Column 33, line 10, delete "erros" and insert --errors--

Signed and Sealed this

Twelfth Day of October 1976

[SEAL]

*Attest:*

RUTH C. MASON
*Attesting Officer*

C. MARSHALL DANN
*Commissioner of Patents and Trademarks*